United States Patent
Sakhnini et al.

(10) Patent No.: US 12,301,275 B2
(45) Date of Patent: May 13, 2025

(54) TRANSMISSION PART HOPPING

(71) Applicant: QUALCOMM Incorporated, San Diego, CA (US)

(72) Inventors: Iyab Issam Sakhnini, San Diego, CA (US); Tao Luo, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/226,871

(22) Filed: Apr. 9, 2021

(65) Prior Publication Data

US 2022/0329281 A1    Oct. 13, 2022

(51) Int. Cl.
  *H04B 1/69* (2011.01)
  *H04W 72/21* (2023.01)

(52) U.S. Cl.
  CPC .............. *H04B 1/69* (2013.01); *H04W 72/21* (2023.01); *H04B 2001/6908* (2013.01); *H04B 2201/698* (2013.01)

(58) Field of Classification Search
  CPC .............. H04B 1/69; H04B 2001/6908; H04B 2201/698; H04W 72/0413
  See application file for complete search history.

(56) References Cited

U.S. PATENT DOCUMENTS

| | | | | |
|---|---|---|---|---|
| 7,978,747 B1* | 7/2011 | Harris | ............ | H04B 1/707 370/335 |
| 11,070,245 B1* | 7/2021 | Herath | ............ | H04L 27/2602 |
| 2014/0037029 A1* | 2/2014 | Murakami | ............ | H04B 7/0456 375/340 |
| 2015/0270868 A1 | 9/2015 | Park | | |
| 2017/0134881 A1* | 5/2017 | Oh | ............ | H04L 5/14 |
| 2018/0287840 A1* | 10/2018 | Akkarakaran | ............ | H04L 27/262 |
| 2020/0092846 A1* | 3/2020 | Deng | ............ | H04W 68/025 |
| 2020/0275326 A1* | 8/2020 | Ma | ............ | H04W 8/24 |

FOREIGN PATENT DOCUMENTS

CN    115119329 A   *  9/2022

OTHER PUBLICATIONS

Machine English translation CN 115119329_A_I (Year: 2021).*
Machine English translation CN 110832931 A (Year: 2020).*
International Search Report and Written Opinion—PCT/US2022/070964—ISA/EPO—Jun. 17, 2022.
Qualcomm Incorporated: "Enhancements on Multi-TRP for PDCCH, PUCCH and PUSCH", 3GPP TSG-RAN WG1 Meeting #104-e, R1-2101447, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-28, XP051971612.

* cited by examiner

*Primary Examiner* — Sam K Ahn
*Assistant Examiner* — Amneet Singh
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, a transmission part (TP) hopping configuration that indicates one or more TPs and a TP hopping pattern associated with one or more hops between the one or more TPs. The UE may communicate, with the base station, using a TP of the one or more TPs based at least in part on the TP hopping configuration. Numerous other aspects are described.

30 Claims, 10 Drawing Sheets

TRANSMISSION PART HOPPING

FIELD OF THE DISCLOSURE

Aspects of the present disclosure generally relate to wireless communication and to techniques and apparatuses for transmission part hopping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, a transmission part (TP) hopping configuration that indicates one or more TPs and a TP hopping pattern associated with one or more hops between the one or more TPs; and communicate, with the base station, using a TP of the one or more TPs based at least in part on the TP hopping configuration.

In some aspects, a base station for wireless communication includes a memory and one or more processors, coupled to the memory, configured to: determine a TP hopping configuration that indicates one or more TPs and a TP hopping pattern associated with one or more hops between the one or more TPs; transmit, to one or more UEs, the TP hopping configuration; and communicate, with a UE of the one or more UEs, using a TP of the one or more TPs based at least in part on the TP hopping configuration.

In some aspects, a method of wireless communication performed by a UE includes receiving, from a base station, a TP hopping configuration that indicates one or more TPs and a TP hopping pattern associated with one or more hops between the one or more TPs; and communicating, with the base station, using a TP of the one or more TPs based at least in part on the TP hopping configuration.

In some aspects, a method of wireless communication performed by a base station includes determining a TP hopping configuration that indicates one or more TPs and a TP hopping pattern associated with one or more hops between the one or more TPs; transmitting, to one or more user UEs, the TP hopping configuration; and communicating, with a UE of the one or more UEs, using a TP of the one or more TPs based at least in part on the TP hopping configuration.

In some aspects, a non-transitory computer-readable medium storing a set of instructions for wireless communication includes one or more instructions that, when executed by one or more processors of a UE, cause the UE to: receive, from a base station, a TP hopping configuration that indicates one or more TPs and a TP hopping pattern associated with one or more hops between the one or more TPs; and communicate, with the base station, using a TP of the one or more TPs based at least in part on the TP hopping configuration.

In some aspects, a non-transitory computer-readable medium storing a set of instructions for wireless communication includes one or more instructions that, when executed by one or more processors of a base station, cause the base station to: determine a TP hopping configuration that indicates one or more TPs and a TP hopping pattern associated with one or more hops between the one or more TPs; transmit, to one or more UEs, the TP hopping configuration; and communicate, with a UE of the one or more UEs, using a TP of the one or more TPs based at least in part on the TP hopping configuration.

In some aspects, an apparatus for wireless communication includes means for receiving, from a base station, a TP hopping configuration that indicates one or more TPs and a TP hopping pattern associated with one or more hops between the one or more TPs; and means for communicating, with the base station, using a TP of the one or more TPs based at least in part on the TP hopping configuration.

In some aspects, an apparatus for wireless communication includes means for determining a TP hopping configuration that indicates one or more TPs and a TP hopping pattern associated with one or more hops between the one or more TPs; means for transmitting, to one or more UEs, the TP hopping configuration; and means for communicating, with a UE of the one or more UEs, using a TP of the one or more TPs based at least in part on the TP hopping configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
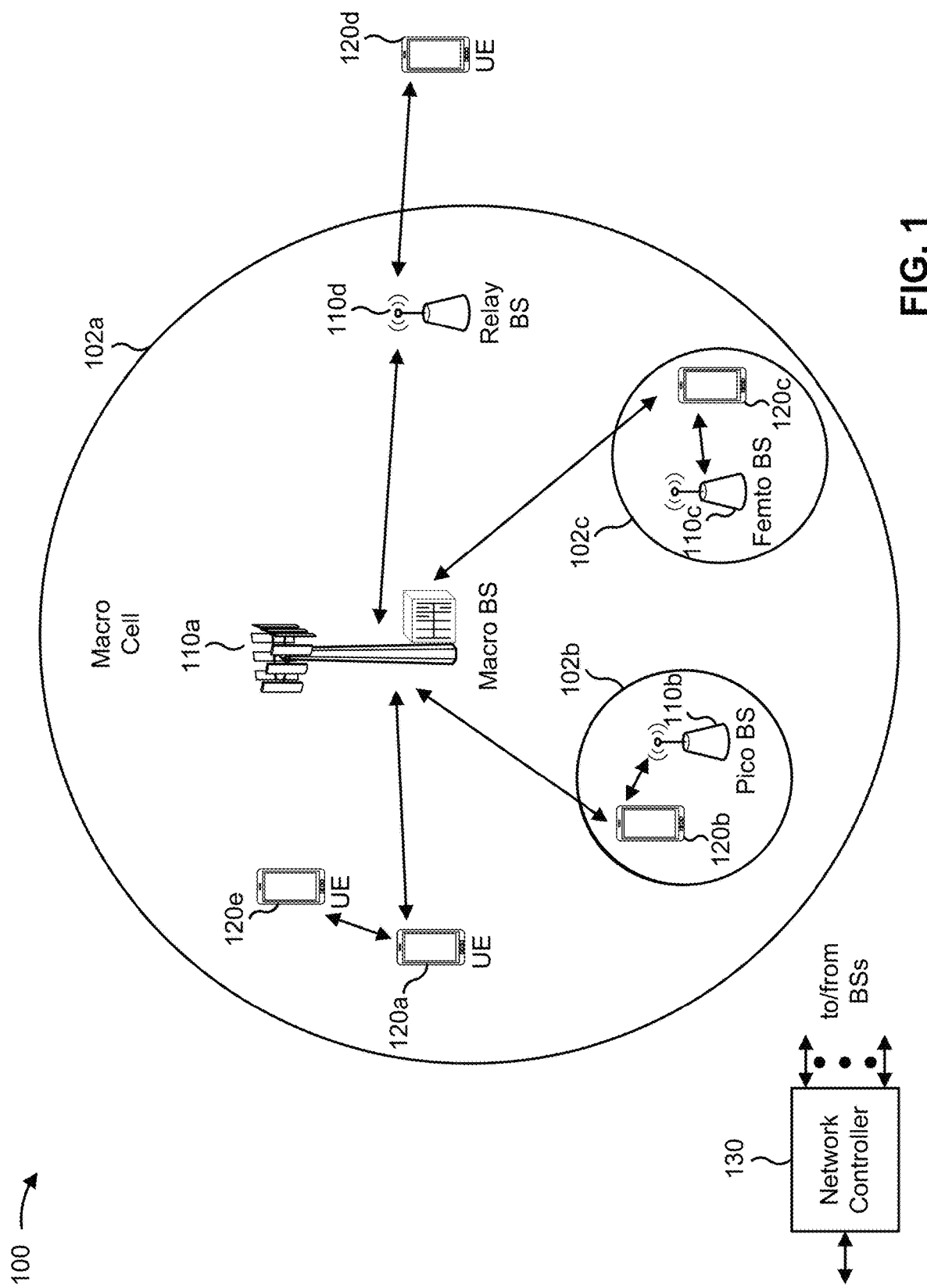
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
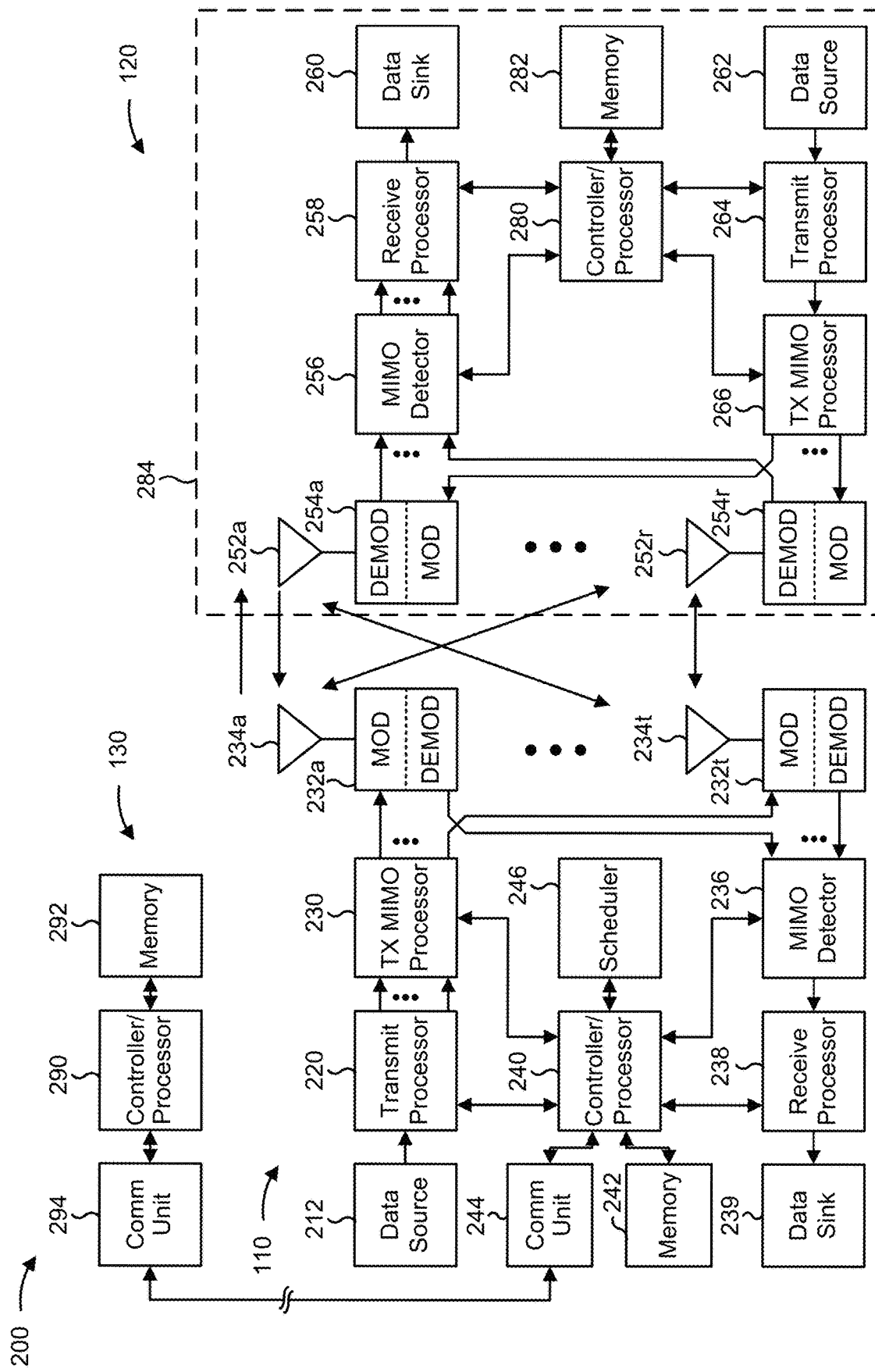
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with transmission part (TP) hopping, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving, from a base station, a TP hopping configuration that indicates one or more TPs and a TP hopping pattern associated with one or more hops between the one or more TPs; and/or means for communicating, with the base station, using a TP of the one or more TPs based at least in part on the TP hopping configuration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving an indication of the TP hopping pattern for the TP of the one or more TPs, the TP hopping pattern indicating, for the TP and from a first TP period to a second TP period, a change in at least one of: a time domain resource allocation for the TP, a frequency domain resource allocation for the TP, or a beam associated with the TP.

In some aspects, the UE 120 includes means for receiving an indication of multiple TPs and the TP hopping pattern associated with the multiple TPs, wherein the TP hopping pattern indicates a first TP, of the multiple TPs, to be used by the UE for a first TP period and a second TP, of the multiple TPs, to be used by the UE for a second TP period.

In some aspects, the UE 120 includes means for receiving an indication of a first index associated with the first TP and a second index associated with the second TP.

In some aspects, the UE 120 includes means for receiving the TP hopping configuration indicating one or more switching gaps or one or more guard bands between a hop from a first TP to a second TP.

In some aspects, the UE 120 includes means for receiving, from the base station, the TP hopping configuration via at least one of a radio resource control message, a medium access control (MAC) control element (MAC-CE) message, or a downlink control information (DCI) message.

In some aspects, the UE 120 includes means for transmitting, to the base station, a request for the TP hopping configuration, and receiving the TP hopping configuration is based at least in part on transmitting the request for the TP hopping configuration.

In some aspects, the UE 120 includes means for identifying the TP hopping configuration based at least in part on an implicit indication.

In some aspects, the UE 120 includes means for identifying a trigger associated with activating or deactivating the TP hopping pattern.

In some aspects, the UE 120 includes means for receiving, from the base station, a message that activates or deactivates the TP hopping pattern, wherein the message includes at least one of: a radio resource control message, a medium access control (MAC) control element (MAC-CE) message, a downlink control information (DCI) message, a DCI message that is specific to the UE, or a group-common DCI message.

In some aspects, the UE 120 includes means for identifying the trigger based at least in part on one or more rules.

In some aspects, the UE 120 includes means for activating the TP hopping pattern after an amount of time after identifying a trigger to activate the TP hopping pattern, wherein the amount of time is at least one of: configured for the UE, indicated by the base station, or based at least in part on a capability of the UE.

In some aspects, the UE 120 includes means for initiating a timer associated with the amount of time after: receiving, from the base station, a message activating the TP hopping pattern; or transmitting, to the base station, an uplink message carrying an acknowledgement (ACK) message associated with a downlink message activating the TP hopping pattern.

In some aspects, the UE 120 includes means for receiving an indication of a default TP associated with the TP hopping pattern.

In some aspects, the base station 110 includes means for determining a TP hopping configuration that indicates one or more TPs and a TP hopping pattern associated with one or more hops between the one or more TPs; means for transmitting, to one or more UEs, the TP hopping configuration; and/or means for communicating, with a UE of the one or more UEs, using a TP of the one or more TPs based at least in part on the TP hopping configuration. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting an indication of the TP hopping pattern for the TP of the one or more TPs, the TP hopping pattern indicating, for the TP and from a first TP period to a second TP period, a change in at least one of: a time domain resource allocation for the TP, a frequency domain resource allocation for the TP, or a beam associated with the TP.

In some aspects, the base station 110 includes means for transmitting an indication of multiple TPs and the TP hopping pattern associated with the multiple TPs, wherein the TP hopping pattern indicates a first TP, of the multiple TPs, to be used by the UE for a first TP period and a second TP, of the multiple TPs, to be used by the UE for a second TP period.

In some aspects, the base station 110 includes means for transmitting an indication of a first index associated with the first TP and a second index associated with the second TP.

In some aspects, the base station 110 includes means for transmitting the TP hopping configuration indicating one or more switching gaps or one or more guard bands between a hop from a first TP to a second TP.

In some aspects, the base station 110 includes means for transmitting the TP hopping configuration via at least one of a radio resource control message, a medium access control (MAC) control element (MAC-CE) message, or a downlink control information (DCI) message.

In some aspects, the base station 110 includes means for receiving, from the UE, a request for the TP hopping configuration, and transmitting the TP hopping configuration is based at least in part on receiving the request for the TP hopping configuration.

In some aspects, the base station 110 includes means for identifying the TP hopping configuration based at least in part on an implicit indication.

In some aspects, the base station 110 includes means for identifying a trigger associated with activating or deactivating the TP hopping pattern.

In some aspects, the base station 110 includes means for transmitting, to the UE, a message that activates or deactivates the TP hopping pattern, wherein the message includes at least one of: a radio resource control message, a MAC-CE message, a DCI message, a DCI message that is specific to the UE, or a group-common DCI message.

In some aspects, the base station 110 includes means for identifying the trigger based at least in part on one or more rules.

In some aspects, the base station 110 includes means for activating the TP hopping pattern after an amount of time after identifying a trigger to activate the TP hopping pattern, wherein the amount of time is at least one of: configured for the UE, indicated to the UE, or based at least in part on a capability of the UE.

In some aspects, the base station 110 includes means for initiating a timer associated with the amount of time after: transmitting, to the UE, a message activating the TP hopping pattern; or receiving, from the UE, an uplink message carrying an ACK message associated with a downlink message activating the TP hopping pattern.

In some aspects, the base station 110 includes means for transmitting an indication of a default TP associated with the TP hopping pattern.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some communication systems may use a single-carrier (SC) waveform in order to reduce peak-to-average power ratio (PAPR), which reduces the required power amplifier (PA) back off for transmission of the waveform. A lower PA back off leads to improved transmission performance and improves utilization of transmit power budget. Examples of SC waveforms include DFT-S-OFDM waveforms and SC quadrature amplitude modulation (SC-QAM) waveforms.

Some NR frequency bands may operate using an OFDM waveform for downlink communications and may operate using either the OFDM waveform or an SC waveform for uplink communications. The OFDM waveform may use a cyclic prefix (CP), and in such cases may be referred to as a CP-OFDM waveform. The OFDM waveform may provide a relatively high signal-to-noise ratio (SNR), a relatively high spectral efficiency, and/or a relative high order single user and/or multi-user MIMO (e.g., as compared to the SC waveform). An SC waveform may provide a relatively low PAPR for better coverage and/or a relatively low complexity for reception and transmission (e.g., as compared to the OFDM waveform). The SC waveform may include, for example, a single carrier time domain (SC-TD) waveform (e.g., an SC-QAM waveform or a single carrier frequency domain (SC-FD) waveform (e.g., a DFT-s-OFDM waveform).

NR may include other frequency ranges in which an SC waveform may also be used for downlink communications to improve PAPR and reduce complexity. The SC waveform may include an SC-TD waveform or an SC-FD waveform to achieve different performance tradeoffs. For example, single carrier waveforms may provide a low PAPR, thereby improving wireless communication performance and coverage. However, single carrier waveforms may not provide support for MIMO operations and/or frequency division multiplex (FDM) operations. For example, an SC-QAM waveform may provide a reduced complexity, as compared to a frequency domain implementation waveform, such as DFT-s-OFDM waveforms and/or OFDM waveforms, as fast Fourier transform (FFT) and inverse FFT (iFFT) operations may not be required. However, an SC-QAM waveform may be suboptimal for FDM operations and/or MIMO operations. Frequency domain implementation waveforms, such as DFT-s-OFDM waveforms and/or OFDM waveforms, may provide efficient bandwidth utilization as guard bands (e.g., a range of frequency resources that are not used) may not be required between bandwidth parts, for example. Additionally, frequency domain equalization may provide a lower complexity than time domain equalization (e.g., that may be required for time domain implementation waveforms, such as SC-QAM waveforms). In some cases, an OFDM waveform may be associated with higher PAPR and/or a high SNR. Additionally, the OFDM waveform may be associated with higher spectral efficiency and/or may support a higher order MIMO operation. As a result, an OFDM waveform may be capable of supporting high data rates.

In some cases, a wireless communication device, such as a UE or a base station, may be capable of supporting multiple waveforms. For example, a UE may be capable of communicating using an OFDM waveform and an SC-QAM waveform. Therefore, a one-size-fits-all approach for waveforms in 5G/NR communications may be suboptimal as different waveforms may be better suited for different channel conditions and/or different scenarios experienced by devices. However, permitting multiple different waveforms to be used (e.g., for downlink communications), such as an OFDM waveform, an SC-TD waveform, and/or an SC-FD waveform, may lead to failed communications between a UE and a base station without proper coordination of which waveform is to be used. Furthermore, some waveforms may be supported by some UEs and/or some base stations and may not be supported by other UEs and/or other base stations.

In some cases, a UE may be configured with a bandwidth part (BWP) on which the UE is to operate. A bandwidth part is a segment of a carrier (e.g., a component carrier) that is associated with a subcarrier spacing (SCS), a CP length, a set of consecutive frequency domain resources, and/or a set of BWP parameters, among other examples. The usage of BWPs may provide efficient bandwidth utilization and may support the deployment of UEs with different capabilities, bandwidth needs, and/or power management requirements, among other examples. In some cases, a UE may be configured with an active BWP, which is a BWP that the UE is to monitor, and one or more other BWPs (referred to as inactive BWPs). The network (e.g., the base station 110 and/or the network controller 130) can instruct the UE to switch to a new active BWP, of the BWPs configured for the UE. For example, the network may transmit downlink control information (DCI) on a downlink control channel, and/or a MAC-CE, among other examples, indicating that the UE is to switch to the new active BWP. However, BWP switching may be frequency based. For example, switching from one BWP to another BWP may change frequency domain resources used by a UE, but may not change time domain resources used by the UE. As devices using single carrier waveforms may be time domain based (e.g., time domain multiplex (TDM) based), a BWP switching framework may not be sufficient for dynamically switching between different waveforms (e.g., between different multiple access systems).

As described above, in higher frequency band operations, channel conditions may not be ideal for certain waveforms and dynamically changing waveforms used by a wireless communication device may be desirable. For example, a wireless communication device may change waveforms based on transmit power requirements, FDM requirements, and/or MIMO requirements, among other examples. In some cases, for example, a UE may be near a cell edge, may be experiencing a low SNR, may have a limited transmit power, and/or may not be required to perform MIMO operations. Therefore, a single carrier waveform may be the optimal waveform for the UE. As another example, a UE may be experiencing a high SNR, may not have a limited transmit power, and/or may be capable of performing higher order MIMO operations. Therefore, an OFDM waveform may be the optimal waveform for the UE. Therefore, a combination of single carrier and OFDM waveforms may be desirable for 5G/NR communications.

However, in a wireless network, different UEs may be associated with different capabilities. For example, UEs may have different capabilities associated with a supported bandwidth, different capabilities associated with mitigating inter-symbol interference (e.g., some UEs may use CPs and some UEs may use guard intervals (GIs) to mitigate inter-symbol interference), different capabilities for equalization (e.g., some UEs may support time domain equalization and not frequency domain equalization, and/or some UEs may support FFT operations and other UEs may not support FFT operations), different switching delay capabilities (e.g., for radio frequency (RF) component switching, bandwidth switching, and/or beam switching), and/or different component capabilities (e.g., different sampling rates), among other examples. Therefore, it is difficult to dynamically change waveforms in a wireless network that includes UEs with diverse capabilities as some UEs may be unable to support certain waveform types or other transmission parameters.

In some cases, a base station may be enabled to organize and/or configure time domain resources and/or frequency domain resources with different waveforms and/or different transmission parameters. For example, the network (e.g., a base station) may configure one or more TPs. As used herein, a "transmission part" or a "TP" may refer to a set of time domain resource and frequency domain resources that are associated with a set of dedicated transmission parameters and/or a waveform type. For example, the set of dedicated transmission parameters may include a waveform type, a beam, a CP length or GI length, an SCS, a sampling rate, a code rate, a bandwidth, and/or one or more switching times, among other examples. By configuring one or more TPs, the network may be enabled to quickly and easily change waveform types and/or other transmission parameters for a UE in a wireless network (e.g., based on channel conditions experienced by the UE). Additionally, by configuring one or more TPs, the network can enable a UE to switch between different waveform types or different multiple access systems while also ensuring that the UE is configured with a TP that satisfies or complies with the capabilities of the UE.

Figure 3:
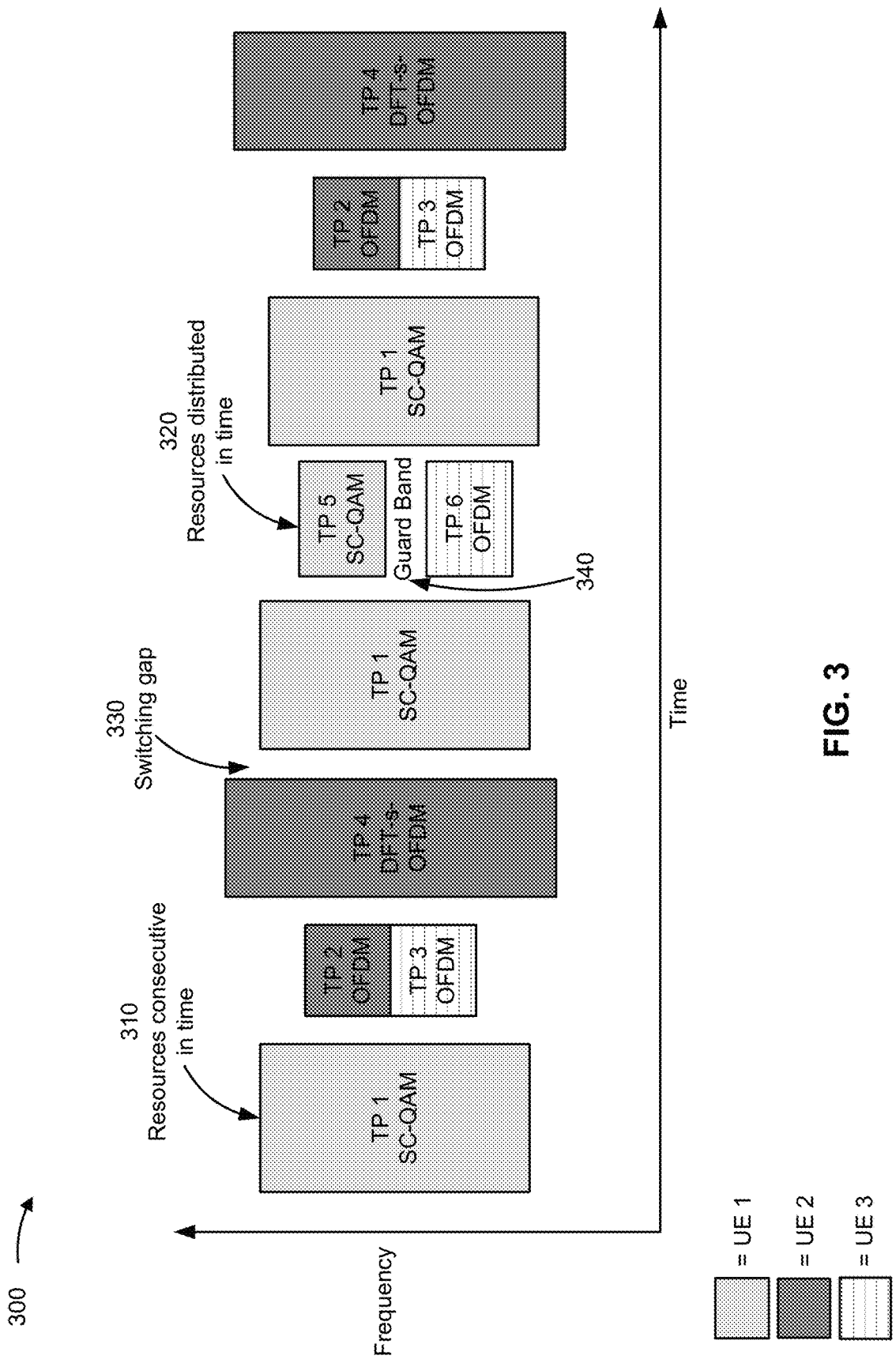
FIG. 3 is a diagram illustrating an example of a transmission part (TP) configuration, in accordance with the present disclosure.

FIG. 3 is a diagram illustrating an example 300 of a TP configuration, in accordance with the present disclosure. As shown in FIG. 3, a base station may configure one more TPs. As described above, a TP may be a set of time domain resource and frequency domain resources that are associated with a set of dedicated transmission parameters and/or a waveform type. For example, the base station may allocate a set of time domain resources and a set of frequency domain resources for a TP. In some cases, an allocation of time domain resources and frequency domain resource allocated for a TP may be configured to repeat periodically. For example, as shown in FIG. 3, a resource allocation (e.g., time domain resources and freuqnecy domain resources) for a first TP (e.g., TP 1) may be configured to repeat periodically (e.g., according to a TP period associated with the TP).

As shown in FIG. 3, a TP may be associated with a waveform type and/or one or more other transmission parameters. For example, the first TP may be associated with an SC-QAM waveform, a second TP (e.g., TP 2) may be associated with an OFDM waveform, a third TP (e.g., TP 3) may be associated with an OFDM waveform, a fourth TP (e.g., TP 4) may be associated with a DFT-s-OFDM waveform, a fifth TP (e.g., TP 5) may be associated with an SC-QAM waveform, and a sixth TP (e.g., TP 6) may be associated with an OFDM waveform. As shown by reference number 310, in some cases, time domain resources allocated for a TP (e.g., the first TP) may be consecutive or contiguous in the time domain. As shown by reference number 320, in some cases, time domain resources allocated for a TP (e.g., the first TP) may be distributed, non-continuous, and/or non-contiguous in the time domain.

In some cases, as shown by reference number 330, the base station may configure one or more switching gaps (e.g., time gaps) between two TPs (e.g., between the fourth TP and the first repetition of the first TP as shown by reference number 330). A switching gap may be associated with an amount of time that is not allocated for any TP. The amount of time may be used by a UE to switch from transmission parameters and/or a waveform type of a first TP to transmission parameters and/or a waveform type of a second TP. For example, a switching gap may be used by a UE for switching from communicating using a single carrier waveform to communicating using an OFDM waveform.

In some cases, as shown by reference number 340, the base station may configure one or more guard bands between two TPs (e.g., between the fifth TP and the sixth TP as shown by reference number 340). A guard band may be a set of frequency resources that are not allocated for any TPs. A guard band may be configured by the base station to reduce interference and/or avoid collisions between two TPs. In some cases, a guard band between two TPs may not be required. For example, as shown in FIG. 3, a guard band may not be required between the second TP and the third TP because both TPs are associated with the OFDM waveform type.

As shown in FIG. 3, the base station may configure or allocate TPs to specific UEs or a group of UEs. For example, the base station may configure a first UE (e.g., UE 1) to use the first TP and the fifth TP. Therefore, the first UE may monitor for communication during the resources allocated for the first TP (e.g., using the transmission parameters and/or waveform type (e.g., SC-QAM) associated with the first TP) and during the resources allocated for the fifth TP (e.g., using the transmission parameters and/or waveform type (e.g., SC-QAM) associated with the fifth TP). The first UE may not monitor for communications during other resources and/or may enter a sleep state during the time domain resources that are not allocated for the first TP and the fifth TP.

Similarly, a second UE (e.g., UE 2) may be configured to use the second TP and the fourth TP. Therefore, the second UE may monitor for communication during the resources allocated for the second TP (e.g., using the transmission parameters and/or waveform type (e.g., OFDM) associated with the second TP) and during the resources allocated for the fourth TP (e.g., using the transmission parameters and/or waveform type (e.g., DFT-s-OFDM) associated with the fourth TP). The second UE may not monitor for communications during other resources and/or may enter a sleep state during the time domain resources that are not allocated for the second TP and the fourth TP. A third UE (e.g., UE 3) may be configured to use the third TP and the sixth TP in a similar manner as described above in connection with the first UE and the second UE.

As a result, the base station may be enabled to configure a UE to use different waveform type and/or different transmission parameters based on a channel condition of the UE and/or a capability of the UE. Moreover, by configuring the UE to use different waveform type and/or different transmission parameters using a resource allocation (e.g., using a configured TP), signaling overhead is reduced. For example, if a framework similar to BWP switching were to be used, signaling would be required to indicate a switch between different TPs. However, by using resource allocation (e.g., using a configured TP), the base station is not required to signal a switch between different TPs, thereby reducing the signaling overhead.

However, in some cases, a TP configuration may introduce one or more problems into a wireless network. For example, beam management and/or waveform management may be time domain processes (e.g., may be TDM processes). Therefore, the first UE may be communicating using the first TP (e.g., using a waveform type and/or beam associated with the first TP) as configured by the base station. In some cases, another UE may receive a communication that is required to be transmitted during the time domain resources associated with the TP. However, the communications by the first UE (e.g., using the waveform type and/or the beam associated with the first TP) may block or interfere with the communication that is required to be transmitted by the other UE during the time domain resources associated with the TP. As a result, the other UE may be unable to transmit the communication during the time domain resources associated with the TP due to the operations of the first UE.

Additionally, or alternatively, a TP configuration may introduce interference among different TRPs. For example, a first TRP (e.g., a first base station) may configure a first TP configuration and a second TRP (e.g., a second base station) may configure a second TP configuration. Communications associated with the first TRP and the second TRP may interfere with one another. Interference characteristics may differ based on a waveform type of the communications. For example, an OFDM waveform interfering with another OFDM waveform may have a first set of interference characteristics (e.g., an interference may be more likely because the same type of waveform is used). An OFDM waveform interfering with an SC-QAM waveform may have a second set of interference characteristics. Therefore, if TP configurations for different TRPs are static or do not change, interference may be introduced into the wireless network.

Further, as described above, the TP configuration may allocate a set of resources (e.g., a set of time domain resources and a set of frequency domain resources) for a TP. As shown in FIG. 3, the resources allocated for the TP may be static (e.g., may not change over time or in repetitions of the TP). Therefore, issues associated with a TP may persist over time. For example, a signal causing interference that is associated with a frequency allocated for the TP may persist over time as the resources associated with the TP may not change. In some cases, dynamic TP management may be used to resolve one or more (or all) of the problems described above. For example, the base station may signal to a UE a change or modification in a TP configuration (e.g., in resources allocated for a TP and/or in TPs associated with the UE). However, the dynamic TP management introduces additional signaling overhead and delays associated with changing or modifying the TP configuration.

Some techniques and apparatuses described herein enable TP hopping to mitigate one or more (or all) of the problems described above. For example, the base station may determine a TP hopping configuration that indicates one or more TPs and a TP hopping pattern. For example, the TP hopping pattern may indicate a change in resources (e.g., time domain and/or frequency domain) and/or transmission parameters (e.g., a beam) for a TP over time. In other words, a TP may be configured to repeat according to a TP period. During a first TP period, the TP may be associated with a first resource allocation and/or a first set of transmission parameters. During a second TP period, the TP may be associated with a second resource allocation and/or a second set of transmission parameters.

In some aspects, the TP hopping pattern may indicated one or more TP hops for a UE associated with a configured set of TPs. For example, the base station may configure one or more TPs as described above and depicted in connection with FIG. 3. The configuration of the TPs may be static (e.g., may not change over time). The TP hopping pattern may indicate one or more TPs that the UE is to hop between, such that the UE does not use the same TPs consistently over time.

By using a TP hopping configuration and a TP hopping pattern, the base station may distribute a usage of the TPs among different UEs in the time domain, the frequency domain, and/or the spatial domain. As a result, a risk of beam and/or waveform blocking may be reduced as a UE may not be consistently using the same TP over time. Additionally, a risk of interference caused by signals associated with the same waveform and/or different waveforms may be reduced. Moreover, the base station may be enabled to reduce the risk of beam and/or waveform blocking and interference without introducing significant signaling overhead and/or delays.

As indicated above, FIG. 3 is provided as an example. Other examples may differ from what is described with respect to FIG. 3.

Figure 4:
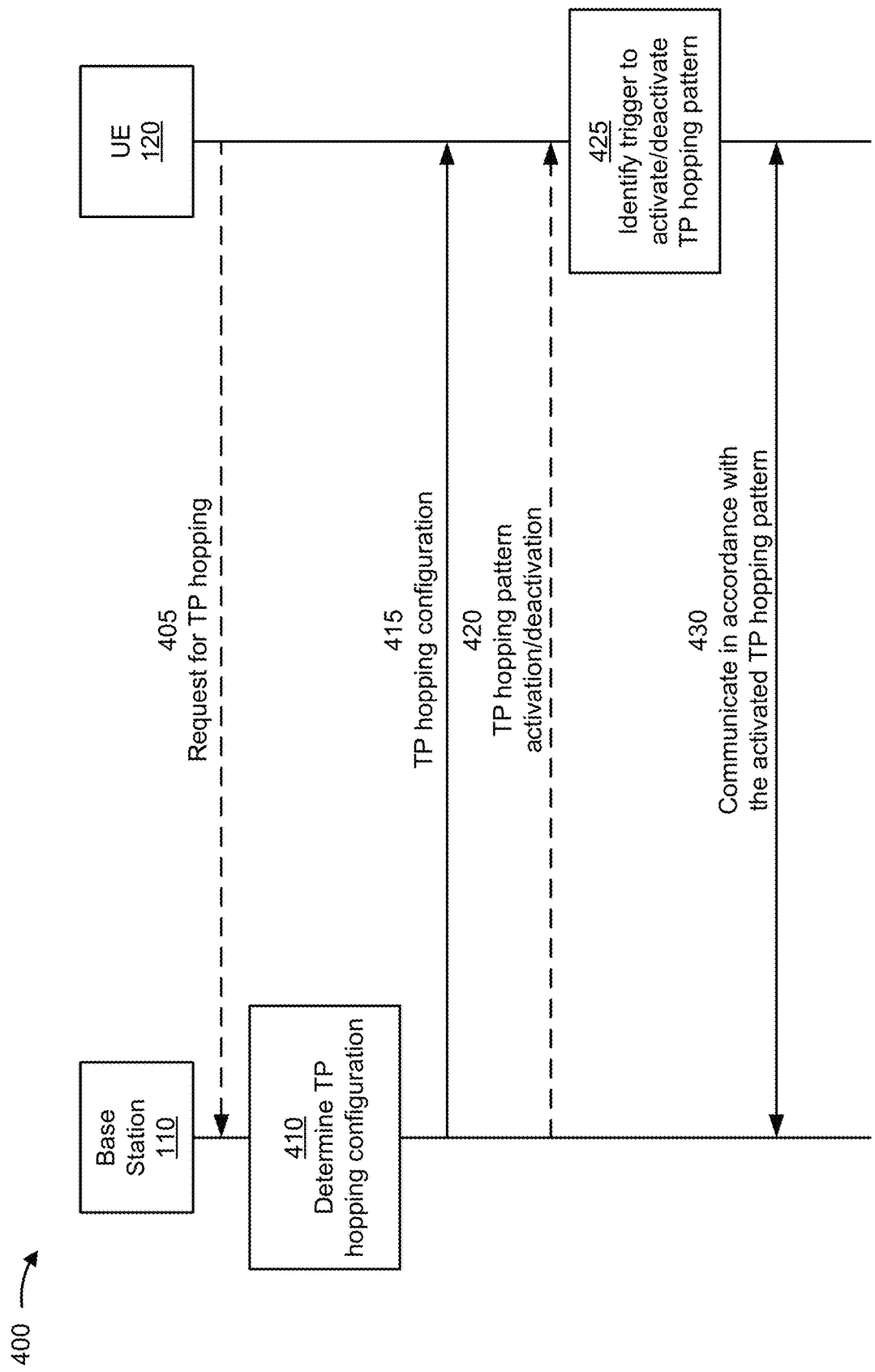
FIGS. 4-6 are diagrams illustrating examples associated with TP hopping, in accordance with the present disclosure.

FIG. 4 is a diagram illustrating an example 400 associated with TP hopping, in accordance with the present disclosure. As shown in FIG. 4, a base station 110 and a UE 120 may communicate with one another. The base station 110 and the UE 120 may be included in a wireless network, such as wireless network 100. In some aspects, the base station 110 may transmit, to the UE 120, a TP configuration. For example, the TP configuration may be similar to the TP configuration described above in connection with FIG. 3.

In some aspects, as shown by reference number 405, the UE 120 may optionally request a TP hopping configuration from the base station 110. For example, the UE 120 may transmit, to the base station, a request for a TP hopping configuration. In some aspects, the request may indicate a TP hopping pattern that is determined by the UE 120. For example, the UE 120 may detect interference based at least in part on communicating using a TP configured by the base station 110. The UE 120 may request a TP hopping configuration in an attempt to mitigate the interference experienced by the UE 120.

As shown by reference number 410, the base station 110 may determine a TP hopping configuration. The TP hopping configuration may indicate one or more TPs and/or a TP hopping pattern. A TP hopping pattern may define one or more TP hops. A TP hop may be associated with a change in a TP configuration (e.g., in resources and/or transmission parameters configured for a TP) from a first TP occasion to a second TP occasion (e.g., as depicted and described in more detail below in connection with FIG. 5). In some aspects, a TP hop may be associated with a UE hopping (e.g., transitioning) a first configured (e.g., static) TP to a second configured (e.g., static) TP (e.g., as depicted and described in more detail below in connection with FIG. 6).

A TP hopping pattern may be in the time domain, the frequency domain, and/or the spatial domain. For example, a TP hopping pattern may indicate a hop (e.g., change) from a first TP to be used by the UE 120 to a second TP to be used by the UE 120 in the time domain (e.g., in time domain resources associated with the first TP and the second TP), in the frequency domain (e.g., in frequency domain resources associated with the first TP and the second TP), and/or in the spatial domain (e.g., in a beam associated with the first TP and a beam associated with the second TP). For example, the TP hopping pattern may indicate a TP hop for a TP from a first TP period to a second TP period associated with the TP. As described above, a TP may be configured to repeat according to a TP period associated with the TP. The TP hopping pattern may indicate a change in resources allocated for the TP with respect to a reference point. For example, the reference point may be a time domain and/or frequency domain reference point. In some aspects, the reference point may be a starting time of a TP period, an ending time of a TP period, a lowest frequency domain allocation of the TP (e.g., a lowest resource element (RE) allocated for the TP), and/or a highest frequency domain allocation of the TP (e.g., a highest RE allocated for the TP). The TP hopping pattern may indicate a resource allocation for the TP in a TP period with respect to the reference point. In this way, the TP hopping pattern may indicate different resources allocated for a TP in different TP periods.

In some aspects, the base station 110 may determine a TP hopping pattern for downlink communications and/or uplink communications. For example, the base station 110 may determine a first TP hopping pattern to be used by the UE 120 for downlink communications and a second TP hopping pattern to be used by the UE 120 for uplink communications. In some aspects, the base station 110 may determine a TP hopping pattern that is to be used by the UE 120 for both downlink communications and uplink communications. In some aspects, the base station 110 may determine a TP hopping configuration (e.g., and/or a TP hopping pattern) that is specific to the UE 120. In some aspects, the base station 110 may determine a TP hopping configuration (e.g., and/or a TP hopping pattern) that is associated with a group of UEs 120 (e.g., that includes the UE 120).

In some aspects, the base station 110 may determine a TP hopping configuration (e.g., and/or a TP hopping pattern) that is specific to a TP. In some aspects, the base station 110 may determine a TP hopping configuration (e.g., and/or a TP hopping pattern) that is associated with a group of (e.g., multiple) TPs. In some aspects, the base station 110 may determine one or more switching gaps and/or one or more guard bands associated with the TP hopping configuration (e.g., and/or a TP hopping pattern). For example, the base station 110 may configure a switching gap between hops indicated by the TP hopping pattern. In some aspects, the base station 110 may configure a guard band between hops indicated by the TP hopping pattern. For example, the base station 110 may determine the one or more switching gaps and/or the one or more guard bands based at least in part on a capability of the UE 120 (e.g., a capability of the UE 120 to switch between different waveform types and/or to support FDM operations).

In some aspects, the base station 110 may determine the TP hopping configuration (e.g., and/or a TP hopping pattern) based at least in part on the request received from the UE 120. For example, the UE 120 may request a TP hopping pattern and/or may request a TP hopping pattern for one or more TPs. The base station 110 may determine the TP hopping configuration (e.g., and/or a TP hopping pattern) based at least in part on the information indicated by the UE 120 in the request for the TP hopping.

In some aspects, the base station 110 may determine a default TP associated with the TP hopping configuration (e.g., and/or a TP hopping pattern). A "default TP" may be a TP to which the UE 120 is to return in the event of a failure (e.g., if an inactivity timer initiated by the UE 120 expires) and/or is to return at one or more configured times (e.g., to perform measurements). The base station 110 may indicate the default TP in the TP hopping configuration.

In some aspects, the TP hopping configuration may be based at least in part one or more rules. For example, the TP hopping configuration may be based at least in part on an implicit indication. The implicit indication may be a semi-persistent scheduling (SPS) pattern, a configured grant (CG) pattern, and/or a waveform usage (e.g., by the UE 120), among other examples. The base station 110 and/or the UE 120 may identify the TP hopping configuration based at least in part on the one or more rules being satisfied and/or with which being complied.

In some aspects, as shown by reference number 415, the base station 110 may transmit, to the UE 120, an indication of the TP hopping configuration. For example, the base station 110 may transmit the indication of the TP hopping configuration using radio resource control (RRC) signaling. The UE 120 may receive the TP hopping configuration and identify the TP hopping pattern and/or the one or more TPs associated with the TP hopping configuration.

The TP hopping pattern may be activated and/or deactivated based at least in part on an explicit indication (e.g., an explicit trigger) and/or an implicit indication (e.g., an implicit trigger). For example, as shown by reference number 420, the base station 110 may transmit a message to activate or deactivate the TP hopping pattern (e.g., that is configured by the TP hopping configuration). The message may be an RRC message, a MAC-CE message, and/or a DCI message (e.g., a UE-specific DCI message or a group-common DCI message), among other examples.

In some aspects, the activation and/or deactivation of the TP hopping pattern may be based at least in part on an implicit indication or an implicit trigger event. For example, the activation and/or deactivation of the TP hopping pattern may be based at least in part on one or more rules (e.g., configured by the base station 110, such as in the TP hopping configuration). For example, a rule may be based at least in part on interference experienced by the UE 120 (e.g., the rule may indicate that if an interference measurement satisfies a threshold, then the TP hopping pattern is to be activated). In some aspects, a rule may be based at least in part on a capability of the UE 120.

In some aspects, the activation and/or deactivation of the TP hopping pattern may be based at least in part on a request from the UE 120. For example, the UE 120 may request that a TP hopping pattern be activated and/or deactivated (e.g., based at least in part on interference experienced by the UE 120). The base station 110 may transmit a message activating or deactivating the TP hopping pattern based at least in part on the request from the UE 120.

As shown by reference number 425, the UE 120 may identify a trigger to activate and/or deactivate a TP hopping pattern. As described above, the trigger may be an explicit trigger (e.g., a message received from the base station 110) and/or an implicit trigger. In some aspects, the UE 120 and/or the base station 110 may activate the TP hopping pattern based at least in part on identifying the trigger. In some aspects, the UE 120 and/or the base station 110 may activate the TP hopping pattern an amount of time after identifying the trigger. For example, the UE 120 may be configured to wait an amount of time after identifying the trigger before activating the TP hopping pattern. In some aspects, the amount of time may be configured (e.g., in an RRC configuration), may be indicated by the base station 110 (e.g., in a downlink message and/or an activation message), and/or may be based at least in part on a capability of the UE 120 (e.g., may be based at least in part on an amount of time required by the UE 120 to activate the TP hopping pattern), among other examples. The UE 120 and/or the base station 110 may activate the TP hopping pattern after the amount of time has passed.

In some aspects, the UE 120 may initiate a timer (e.g., that is associated with the amount of time) after receiving, from the base station 110, a message activating the TP hopping pattern, or after transmitting, to the base station 110, an uplink message carrying an ACK message associated with a downlink message activating the TP hopping pattern. Similarly, the base station 110 may initiate a timer (e.g., that is associated with the amount of time) after transmitting, to the UE 120, a message activating the TP hopping pattern, or after receiving, from the UE 120, an uplink message carrying an ACK message associated with a downlink message activating the TP hopping pattern. The UE 120 and/or the base station 110 may activate the TP hopping pattern after an expiration of the timer.

As shown by reference number 430, the base station 110 and the UE 120 may communicate (e.g., transmit, receive, and/or monitor for communications) in accordance with the activated TP hopping pattern. For example, the UE 120 may monitor for communications in accordance with the TPs defined by the TP hopping pattern. In some aspects, the UE 120 may transmit, to the base station 110, one or more uplink communications, during resources allocated for a TP as defined by the TP hopping pattern, using a waveform type and/or one or more other transmission parameters associated with the TP. In some aspects, the UE 120 may receive, from the base station 110, one or more downlink communications, during resources allocated for a TP as defined by the TP hopping pattern, using a waveform type and/or one or more other transmission parameters associated with the TP.

In some aspects, a TP configuration may indicate a TP reference point associated with a TP for one or more procedures, measurements, and/or resource grants. For example, a TP reference point may be a point in the time domain and/or the frequency domain that is to be a reference for the one or more procedures, measurements, and/or resource grants. For example, a TP reference point may be a starting time and/or ending time of a time domain resource allocation for the TP and a lowest and/or highest frequency domain resource allocation for the TP. The TP reference point may remain the same for a TP during the TP hopping pattern. For example, in accordance with the TP hopping pattern, a resource allocation for a TP may change over time. However, a TP reference point with respect to the resource allocation may remain the same. For example, if the TP reference point is the starting time of the time domain resource allocation and a lowest RE allocated for the TP, the reference point will remain as the starting time of the time domain resource allocation and a lowest RE allocated for the TP regardless of the resource allocation for the TP. In this way, the UE 120 and/or the base station 110 may be enabled to perform the one or more procedures, measurements, and/or resource grants as resource allocations for a TP change over time.

In some aspects, one or more parameters for a procedure are the same for all TPs associated with the TP hopping configuration or may be defined separately for each TP associated with the TP hopping configuration. For example, the UE 120 may be configured to perform one or more procedures, such as a hybrid automatic repeat request (HARQ) procedure, a radio link management procedure, a radio resource management measurement procedure, a beam failure detection procedure, and/or a beam failure recovery procedure, among other examples. The procedures may be associated with one or more parameters, such as one or more processes to be performed by the UE 120, one or more measurements to be performed by the UE 120, and/or one or more timers to be maintained by the UE 120, among other examples.

In some aspects, the parameters for a procedure may be transparent to the TP hopping pattern. In other words, the UE 120 may be configured with one or more parameters for a procedure that apply regardless of the TP hopping pattern. For example, one or more counters or one or more timers associated with a procedure may continue (e.g., not reset) when a TP hop occurs. The one or more counters or one or more timers associated with a procedure may continue to run or may continue to count regardless of a TP hop. In some aspects, the parameters for a procedure may be maintained separately per TP hop and/or per TP. For example, in some cases, different parameters may be used by the UE 120 in different TPs for the same procedure (e.g., due to different waveform type requirements). Therefore, the UE 120 may maintain one or more parameters for a procedure for each TP hop and/or for each TP. For example, a timer or a counter may be maintained separately for each TP hop or for each TP. In some aspects, whether the UE 120 is to maintain one or more parameters for a procedure for each TP hop and/or for each TP may be signaled to the UE 120 (e.g., by the base station 110). In this way, the UE 120 may be enabled to perform different procedures while also performing TP hopping.

By using a TP hopping configuration and a TP hopping pattern, the base station 110 may distribute a usage of the TPs among different UEs 120 in the time domain, the frequency domain, and/or the spatial domain. As a result, a risk of beam and/or waveform blocking may be reduced as a UE 120 may not be consistently using the same TP over time. Additionally, a risk of interference caused by signals associated with the same waveform and/or different waveforms may be reduced. Moreover, the base station 110 may be enabled to reduce the risk of beam and/or waveform blocking and interference without introducing significant signaling overhead and/or delays.

As indicated above, FIG. 4 is provided as an example. Other examples may differ from what is described with respect to FIG. 4.

Figure 5:
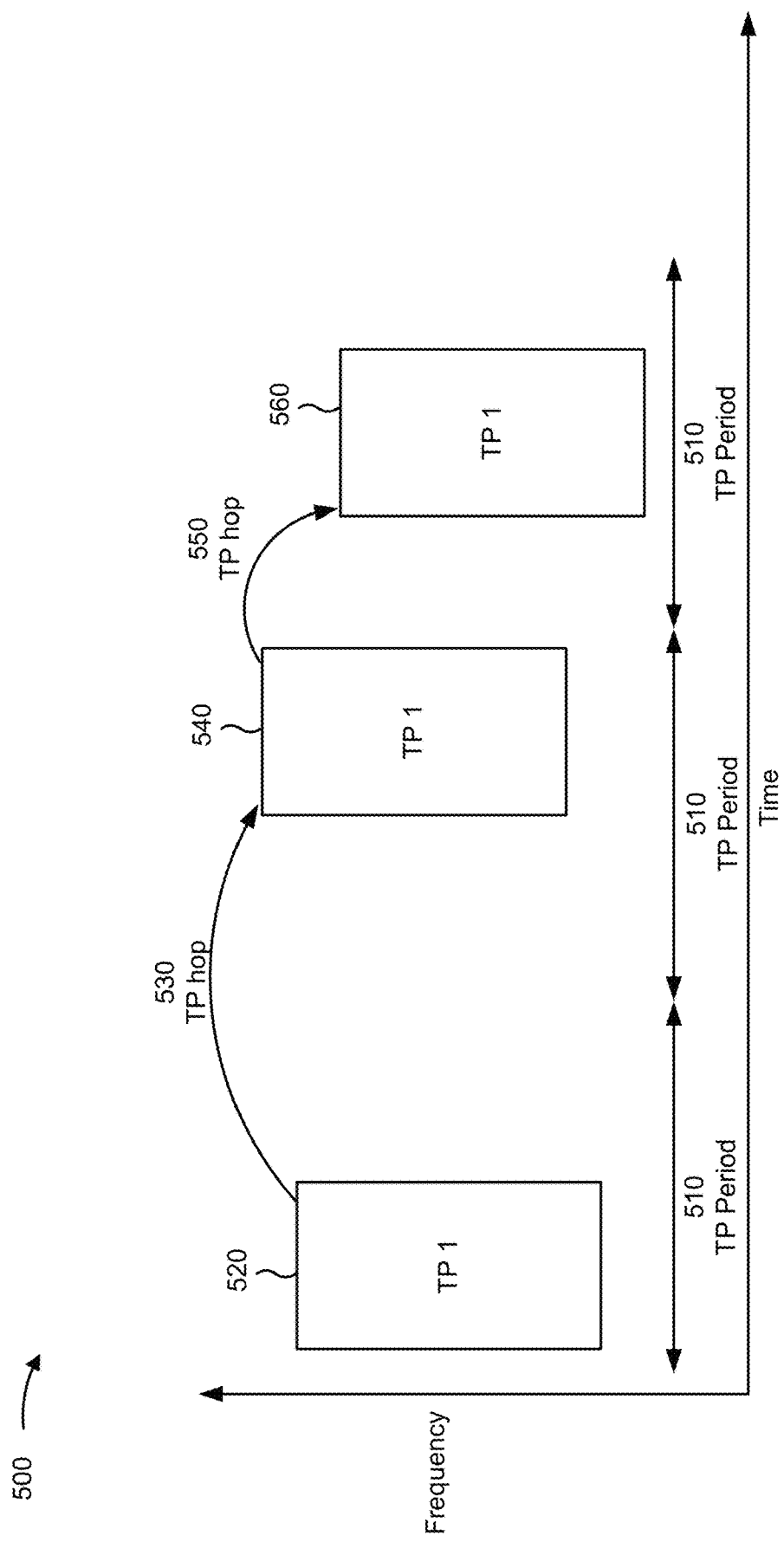

FIG. 5 is a diagram illustrating an example 500 associated with TP hopping, in accordance with the present disclosure. As shown in FIG. 5, a TP hopping pattern may be associated with a TP (e.g., TP 1 as shown in FIG. 5). For example, the TP hopping pattern may be indicated in a TP hopping configuration in a similar manner as described above in connection with FIG. 4.

As shown in FIG. 5, and by reference number 510, the TP may be configured to repeat according to a TP period. That is, the TP may be configured to occur once each TP period. The TP hopping pattern may indicate that a resource allocation and/or one or more transmission parameters for the TP are to hop (e.g., change) from one TP period to another TP period. For example, as shown by reference number 520, a first occasion of the TP may be associated with a first resource allocation (e.g., a first time domain resource allocation and a first frequency domain resource allocation) and a first set of transmission parameters (e.g., a first beam, a first SCS, a first waveform type, and/or a first bandwidth).

As shown by reference number 530, the TP hopping pattern may indicate a first TP hop from the first occasion of the TP (e.g., during the first TP period) to a second occasion of the TP (e.g., shown by reference number 540 during a second TP period). The first TP hop may indicate a shift or change in a resource allocation for the TP and/or one or more transmission parameters (e.g., with respect to the first occasion of the TP). For example, the first TP hop may indicate that a time domain resource allocation and/or frequency domain resource allocation for the TP is to be different for the second occasion of the TP as compared to the first occasion of the TP. For example, the TP hopping pattern may indicate that the second occasion of the TP is to be associated with a second time domain resource allocation (e.g., that is different than the first time domain resource allocation) and/or a second frequency domain resource allocation (e.g., that is different than the first frequency domain resource allocation). Additionally, or alternatively, the first TP hop may indicate that one or more transmission parameters for the TP are to be different for the second occasion of the TP as compared to the first occasion of the TP. For example, the TP hopping pattern may indicate that the second occasion of the TP is to be associated with a second beam, a second SCS, a second waveform type, and/or a second bandwidth, among other examples. As described above, the TP hopping pattern may indicate a resource allocation for the second occasion of the TP using a reference point associated with the TP period (e.g., a starting time of the TP period and/or a lowest RE associated with the TP).

As shown by reference number 550, the TP hopping pattern may indicate a second TP hop from the second occasion of the TP (e.g., during the second TP period) to a third occasion of the TP (e.g., shown by reference number 560 during a third TP period). The second TP hop may indicate a shift or change in a resource allocation for the TP and/or one or more transmission parameters (e.g., with respect to the second occasion of the TP and/or the first occasion of the TP) in a similar manner as described above. For example, the third occasion of the TP may be associated with a third time domain resource allocation (e.g., that is different than the first time domain resource allocation and/or the second time domain resource allocation) and/or a third frequency domain resource allocation (e.g., that is different than the first frequency domain resource allocation and/or the second frequency domain resource allocation). Additionally, or alternatively, the third occasion of the TP may be associated with a third beam, a third SCS, a third waveform type, and/or a third bandwidth, among other examples.

In this way, the TP hopping pattern may shift or change a resource allocation and/or one or more transmission parameters for a TP over time (e.g., over different TP periods). For example, a UE 120 may be configured to communicate using the TP (e.g., TP 1) over time in accordance with the TP hopping pattern shown in FIG. 5, as described above in connection with FIG. 4.

As indicated above, FIG. 5 is provided as an example. Other examples may differ from what is described with respect to FIG. 5.

Figure 6:
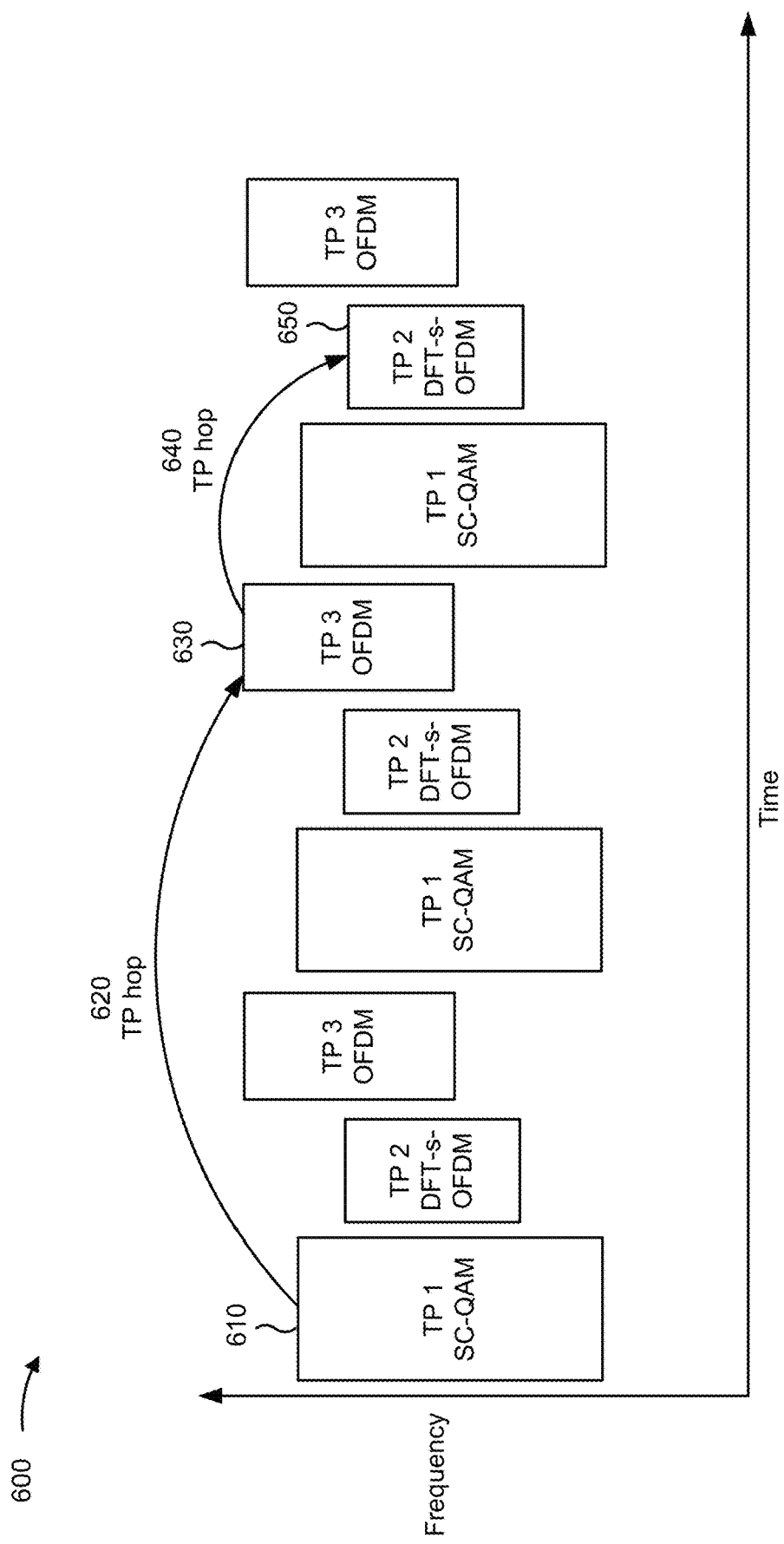

FIG. 6 is a diagram illustrating an example 600 associated with TP hopping, in accordance with the present disclosure. As shown in FIG. 6 a TP hopping pattern may be associated with multiple TPs. For example, the TP hopping pattern may be indicated in a TP hopping configuration in a similar manner as described above in connection with FIG. 4. As shown in FIG. 6, a base station 110 may configure multiple TPs (e.g., TP 1, TP2, and/or TP3, as shown in FIG. 6), in a similar manner as described above in connection with FIGS. 3 and 4. The TPs configured by the base station may be fixed and/or static (e.g., a resource allocation and/or transmission parameters associated with the TP may not change over time). For example, the first TP (e.g., TP 1) may be associated with an SC-QAM waveform, the second TP (e.g., TP 2) may be associated with a DFT-s-OFDM waveform, and the third TP (e.g., TP 3) may be associated with an OFDM waveform type. As shown in FIG. 6, the multiple TPs may be configured to repeat in a similar manner as described above.

As shown by reference number 610, the TP hopping pattern may indicate that a UE 120 is to use a first occasion of the first TP. As shown by reference number 620, a first TP hop may indicate that the UE 120 is to use a second occasion of the third TP (e.g., as shown by reference number 630). For example, the TP hopping pattern may indicate that the UE 120 is not to use the second occasion of the first TP and is instead to use the second occasion of the third TP. As shown by reference number 640, a second TP hop may indicate that the UE 120 is to use a third occasion of the second TP (e.g., as shown by reference number 650). For example, the TP hopping pattern may indicate that the UE 120 is not to use the third occasion of the first TP and is not to use the third occasion of the third TP and is instead to use the third occasion of the second TP.

In some aspects, a TP configuration may configure the first TP, the second TP, and the third TP (e.g., and the repetitions and/or occasions of the TPs). The TP hopping pattern may indicate which TPs of the configured TPs (e.g., the configured repetitions and/or occasions of the TPs) that the UE 120 is to use over time. For example, the TP hopping pattern may indicate a first index or a first identifier associated with the first occasion of the first TP, a second index or a second identifier associated with the second occasion of the third TP, and a third index or a third identifier associated with the third occasion of the second TP. In this way, the UE 120 may be enabled to identify the TP hopping pattern and the TPs that the UE 120 is to use to communicate over time. As a result, the TP hopping pattern may shift or change a TP that the UE 120 is using over time (e.g., so that the UE 120 does not continually use the same TP over time that may cause blocking and/or interference). For example, a UE 120 may be configured to communicate using different TPs over time in accordance with the TP hopping pattern shown in FIG. 6, as described above in connection with FIG. 4.

As indicated above, FIG. 6 is provided as an example. Other examples may differ from what is described with respect to FIG. 6.

Figure 7:
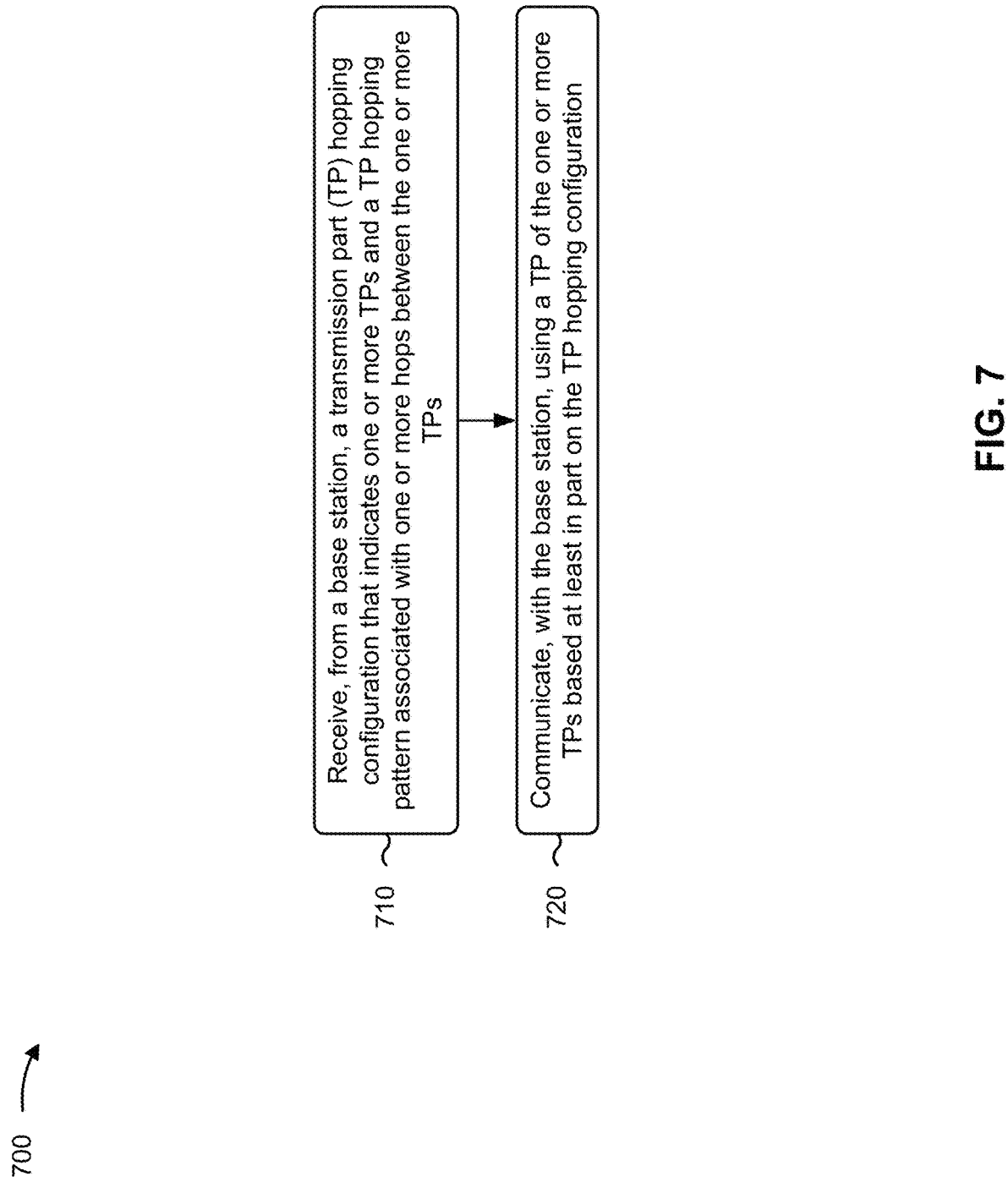
FIGS. 7 and 8 are diagrams illustrating example processes associated with TP hopping, in accordance with the present disclosure.

FIG. 7 is a diagram illustrating an example process 700 performed, for example, by a UE, in accordance with the present disclosure. Example process 700 is an example where the UE (e.g., UE 120) performs operations associated with TP hopping.

As shown in FIG. 7, in some aspects, process 700 may include receiving, from a base station, a TP hopping configuration that indicates one or more TPs and a TP hopping pattern associated with one or more hops between the one or more TPs (block 710). For example, the UE (e.g., using reception component 902, depicted in FIG. 9) may receive, from a base station, a TP hopping configuration that indicates one or more TPs and a TP hopping pattern associated with one or more hops between the one or more TPs, as described above.

As further shown in FIG. 7, in some aspects, process 700 may include communicating, with the base station, using a TP of the one or more TPs based at least in part on the TP hopping configuration (block 720). For example, the UE (e.g., using reception component 902 and/or transmission component 904, depicted in FIG. 9) may communicate, with the base station, using a TP of the one or more TPs based at least in part on the TP hopping configuration, as described above.

Process 700 may include additional aspects, such as any single aspect or any combination of aspects described below and/or in connection with one or more other processes described elsewhere herein.

In a first aspect, the TP indicates a time domain resource allocation and a frequency domain resource allocation associated with the TP and one or more transmission parameters associated with the TP.

In a second aspect, alone or in combination with the first aspect, the one or more transmission parameters include at least one of a waveform type, a cyclic prefix length, a guard interval length, a subcarrier spacing, a code rate, a bandwidth, or one or more switching times.

In a third aspect, alone or in combination with one or more of the first and second aspects, the waveform type includes at least one of a single carrier waveform, a single carrier frequency domain waveform, a single carrier time domain waveform, a DFT-s-OFDM waveform, an SC-QAM waveform, or an OFDM waveform.

In a fourth aspect, alone or in combination with one or more of the first through third aspects, receiving the TP hopping configuration comprises receiving an indication of the TP hopping pattern for the TP of the one or more TPs, the TP hopping pattern indicating, for the TP and from a first TP period to a second TP period, a change in at least one of a time domain resource allocation for the TP, a frequency domain resource allocation for the TP, or a beam associated with the TP.

In a fifth aspect, alone or in combination with one or more of the first through fourth aspects, the TP hopping pattern is based at least in part on a reference point associated with a TP period associated with the TP.

In a sixth aspect, alone or in combination with one or more of the first through fifth aspects, the reference point is at least one of a starting time of the TP period, an ending time of the TP period, a lowest frequency domain resource allocated for the TP, or a highest frequency domain resource allocated for the TP.

In a seventh aspect, alone or in combination with one or more of the first through sixth aspects, receiving the TP hopping configuration comprises receiving an indication of multiple TPs and the TP hopping pattern associated with the multiple TPs, wherein the TP hopping pattern indicates a first TP, of the multiple TPs, to be used by the UE for a first TP period and a second TP, of the multiple TPs, to be used by the UE for a second TP period.

In an eighth aspect, alone or in combination with one or more of the first through seventh aspects, receiving the TP hopping configuration comprises receiving an indication of a first index associated with the first TP and a second index associated with the second TP.

In a ninth aspect, alone or in combination with one or more of the first through eighth aspects, receiving the TP hopping configuration comprises receiving at least one of a TP hopping configuration for uplink communications, a TP hopping configuration for downlink communications, a TP hopping configuration for uplink communications and downlink communications, a TP hopping configuration that is specific for the UE, a TP hopping configuration that is associated with a group of UEs that includes the UE, a TP hopping configuration for the TP, or a TP hopping configuration for a group of TPs that includes the one or more TPs.

In a tenth aspect, alone or in combination with one or more of the first through ninth aspects, receiving the TP hopping configuration comprises receiving the TP hopping configuration indicating one or more switching gaps or one or more guard bands between a hop from a first TP to a second TP.

In an eleventh aspect, alone or in combination with one or more of the first through tenth aspects, receiving the TP hopping configuration comprises receiving, from the base station, the TP hopping configuration via at least one of a radio resource control message, a medium access control (MAC) control element (MAC-CE) message, or a downlink control information (DCI) message.

In a twelfth aspect, alone or in combination with one or more of the first through eleventh aspects, process 700 includes transmitting, to the base station, a request for the TP hopping configuration, and wherein receiving the TP hopping configuration is based at least in part on transmitting the request for the TP hopping configuration.

In a thirteenth aspect, alone or in combination with one or more of the first through twelfth aspects, process 700 includes identifying the TP hopping configuration based at least in part on an implicit indication.

In a fourteenth aspect, alone or in combination with one or more of the first through thirteenth aspects, the implicit indication includes at least one of one or more rules, a SPS pattern associated with communications between the UE and the base station, a configured grant pattern associated with communications between the UE and the base station, or a waveform usage associated with communications between the UE and the base station.

In a fifteenth aspect, alone or in combination with one or more of the first through fourteenth aspects, process 700 includes identifying a trigger associated with activating or deactivating the TP hopping pattern.

In a sixteenth aspect, alone or in combination with one or more of the first through fifteenth aspects, identifying the trigger associated with activating or deactivating the TP hopping pattern comprises receiving, from the base station, a message that activates or deactivates the TP hopping pattern, wherein the message includes at least one of a radio resource control message, a MAC-CE message, a DCI message, a DCI message that is specific to the UE, or a group-common DCI message.

In a seventeenth aspect, alone or in combination with one or more of the first through sixteenth aspects, identifying the trigger associated with activating or deactivating the TP hopping pattern comprises identifying the trigger based at least in part on one or more rules.

In an eighteenth aspect, alone or in combination with one or more of the first through seventeenth aspects, a TP reference point for the TP is defined with respect to a resource allocation associated with the TP, and wherein the TP reference point for the TP remains the same with respect to the resource allocation throughout the TP hopping pattern.

In a nineteenth aspect, alone or in combination with one or more of the first through eighteenth aspects, process 700 includes activating the TP hopping pattern after an amount of time after identifying a trigger to activate the TP hopping pattern, wherein the amount of time is at least one of configuring for the UE, indicating by the base station, or basing at least in part on a capability of the UE.

In a twentieth aspect, alone or in combination with one or more of the first through nineteenth aspects, activating the TP hopping pattern the amount of time after identifying a trigger to activate the TP hopping pattern comprises initiating a timer associated with the amount of time after: receiving, from the base station, a message activating the TP hopping pattern; or transmitting, to the base station, an uplink message carrying an ACK message associated with a downlink message activating the TP hopping pattern.

In a twenty-first aspect, alone or in combination with one or more of the first through twentieth aspects, one or more parameters for a procedure are transparent to the TP hopping configuration or are defined separately for each TP associated with the TP hopping configuration.

In a twenty-second aspect, alone or in combination with one or more of the first through twenty-first aspects, the procedure includes at least one of a hybrid automatic repeat request procedure, a radio link management procedure, a radio resource management measurement procedure, a beam failure detection procedure, or a beam failure recovery procedure.

In a twenty-third aspect, alone or in combination with one or more of the first through twenty-second aspects, receiving the TP hopping configuration comprises receiving an indication of a default TP associated with the TP hopping pattern.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
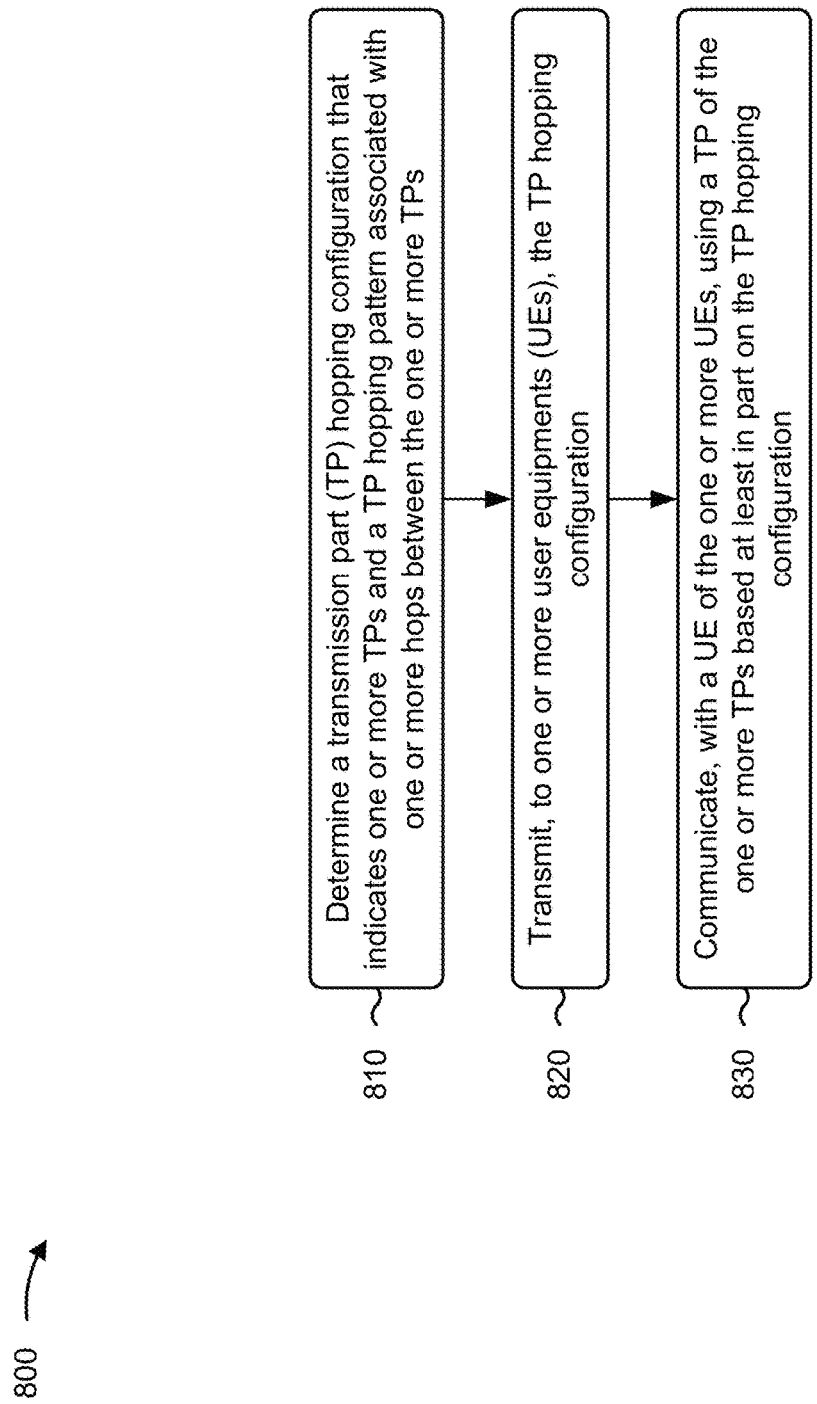

FIG. 8 is a diagram illustrating an example process 800 performed, for example, by a base station, in accordance with the present disclosure. Example process 800 is an example where the base station (e.g., base station 110) performs operations associated with TP hopping.

As shown in FIG. 8, in some aspects, process 800 may include determining a TP hopping configuration that indicates one or more TPs and a TP hopping pattern associated with one or more hops between the one or more TPs (block 810). For example, the base station (e.g., using determination component 1008, depicted in FIG. 10) may determine a TP hopping configuration that indicates one or more TPs and a TP hopping pattern associated with one or more hops between the one or more TPs, as described above.

As further shown in FIG. 8, in some aspects, process 800 may include transmitting, to one or more UEs, the TP hopping configuration (block 820). For example, the base station (e.g., using transmission component 1004, depicted in FIG. 10) may transmit, to one or more UEs, the TP hopping configuration, as described above.

As further shown in FIG. 8, in some aspects, process 800 may include communicating, with a UE of the one or more UEs, using a TP of the one or more TPs based at least in part on the TP hopping configuration (block 830). For example, the base station (e.g., using reception component 1002 and/or transmission component 1004, depicted in FIG. 10) may communicate, with a UE of the one or more UEs, using a TP of the one or more TPs based at least in part on the TP hopping configuration, as described above.

Process 800 may include additional aspects, such as any single aspect or any combination of aspects described below and/or in connection with one or more other processes described elsewhere herein.

In a first aspect, the TP indicates a time domain resource allocation and a frequency domain resource allocation associated with the TP and one or more transmission parameters to be used by the UE associated with the TP.

In a second aspect, alone or in combination with the first aspect, the one or more transmission parameters include at least one of a waveform type, a cyclic prefix length, a guard interval length, a subcarrier spacing, a code rate, a bandwidth, or one or more switching times.

In a third aspect, alone or in combination with one or more of the first and second aspects, the waveform type includes at least one of a single carrier waveform, a single carrier frequency domain waveform, a single carrier time domain waveform, a DFT-s-OFDM waveform, an SC-QAM waveform, or an OFDM waveform.

In a fourth aspect, alone or in combination with one or more of the first through third aspects, transmitting the TP hopping configuration comprises transmitting an indication of the TP hopping pattern for the TP of the one or more TPs, the TP hopping pattern indicating, for the TP and from a first TP period to a second TP period, a change in at least one of a time domain resource allocation for the TP, a frequency domain resource allocation for the TP, or a beam associated with the TP.

In a fifth aspect, alone or in combination with one or more of the first through fourth aspects, the TP hopping pattern is based at least in part on a reference point associated with a TP period associated with the TP.

In a sixth aspect, alone or in combination with one or more of the first through fifth aspects, the reference point is at least one of a starting time of the TP period, an ending time of the TP period, a lowest frequency domain resource allocated for the TP, or a highest frequency domain resource allocated for the TP.

In a seventh aspect, alone or in combination with one or more of the first through sixth aspects, transmitting the TP hopping configuration comprises transmitting an indication of multiple TPs and the TP hopping pattern associated with the multiple TPs, wherein the TP hopping pattern indicates a first TP, of the multiple TPs, to be used by the UE for a first TP period and a second TP, of the multiple TPs, to be used by the UE for a second TP period.

In an eighth aspect, alone or in combination with one or more of the first through seventh aspects, transmitting the TP hopping configuration comprises transmitting an indication of a first index associated with the first TP and a second index associated with the second TP.

In a ninth aspect, alone or in combination with one or more of the first through eighth aspects, transmitting the TP hopping configuration comprises transmitting at least one of a TP hopping configuration for uplink communications, a TP hopping configuration for downlink communications, a TP hopping configuration for uplink communications and downlink communications, a TP hopping configuration that is specific for the UE, a TP hopping configuration that is associated with a group of UEs that includes the one or more UEs, a TP hopping configuration for the TP, or a TP hopping configuration for a group of TPs that includes the one or more TPs.

In a tenth aspect, alone or in combination with one or more of the first through ninth aspects, transmitting the TP hopping configuration comprises transmitting the TP hopping configuration indicating one or more switching gaps or one or more guard bands between a hop from a first TP to a second TP.

In an eleventh aspect, alone or in combination with one or more of the first through tenth aspects, transmitting the TP hopping configuration comprises transmitting the TP hopping configuration via at least one of a radio resource control message, a MAC-CE message, or a DCI message.

In a twelfth aspect, alone or in combination with one or more of the first through eleventh aspects, process 800 includes receiving, from the UE, a request for the TP hopping configuration, and wherein transmitting the TP hopping configuration is based at least in part on receiving the request for the TP hopping configuration.

In a thirteenth aspect, alone or in combination with one or more of the first through twelfth aspects, process 800 includes identifying the TP hopping configuration based at least in part on an implicit indication.

In a fourteenth aspect, alone or in combination with one or more of the first through thirteenth aspects, the implicit indication includes at least one of one or more rules, an SPS pattern associated with communications between the UE and the base station, a configured grant pattern associated with communications between the UE and the base station, or a waveform usage associated with communications between the UE and the base station.

In a fifteenth aspect, alone or in combination with one or more of the first through fourteenth aspects, process 800 includes identifying a trigger associated with activating or deactivating the TP hopping pattern.

In a sixteenth aspect, alone or in combination with one or more of the first through fifteenth aspects, identifying the trigger associated with activating or deactivating the TP hopping pattern comprises transmitting, to the UE, a message that activates or deactivates the TP hopping pattern, wherein the message includes at least one of a radio resource control message, a MAC-CE message, a DCI message, a DCI message that is specific to the UE, or a group-common DCI message.

In a seventeenth aspect, alone or in combination with one or more of the first through sixteenth aspects, identifying the trigger associated with activating or deactivating the TP hopping pattern comprises identifying the trigger based at least in part on one or more rules.

In an eighteenth aspect, alone or in combination with one or more of the first through seventeenth aspects, a TP reference point for the TP is defined with respect to a resource allocation associated with the TP, and wherein the TP reference point for the TP remains the same with respect to the resource allocation throughout the TP hopping pattern.

In a nineteenth aspect, alone or in combination with one or more of the first through eighteenth aspects, process 800 includes activating the TP hopping pattern after an amount of time after identifying a trigger to activate the TP hopping pattern, wherein the amount of time is at least one of configuring for the UE, indicating to the UE, or basing at least in part on a capability of the UE.

In a twentieth aspect, alone or in combination with one or more of the first through nineteenth aspects, activating the TP hopping pattern the amount of time after identifying a trigger to activate the TP hopping pattern comprises initiating a timer associated with the amount of time after: transmitting, to the UE, a message activating the TP hopping pattern; or receiving, from the UE, an uplink message carrying an ACK message associated with a downlink message activating the TP hopping pattern.

In a twenty-first aspect, alone or in combination with one or more of the first through twentieth aspects, one or more parameters for a procedure are transparent to the TP hopping configuration or are defined separately for each TP associated with the TP hopping configuration.

In a twenty-second aspect, alone or in combination with one or more of the first through twenty-first aspects, the procedure includes at least one of a hybrid automatic repeat request procedure, a radio link management procedure, a radio resource management measurement procedure, a beam failure detection procedure, or a beam failure recovery procedure.

In a twenty-third aspect, alone or in combination with one or more of the first through twenty-second aspects, transmitting the TP hopping configuration comprises transmitting an indication of a default TP associated with the TP hopping pattern.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
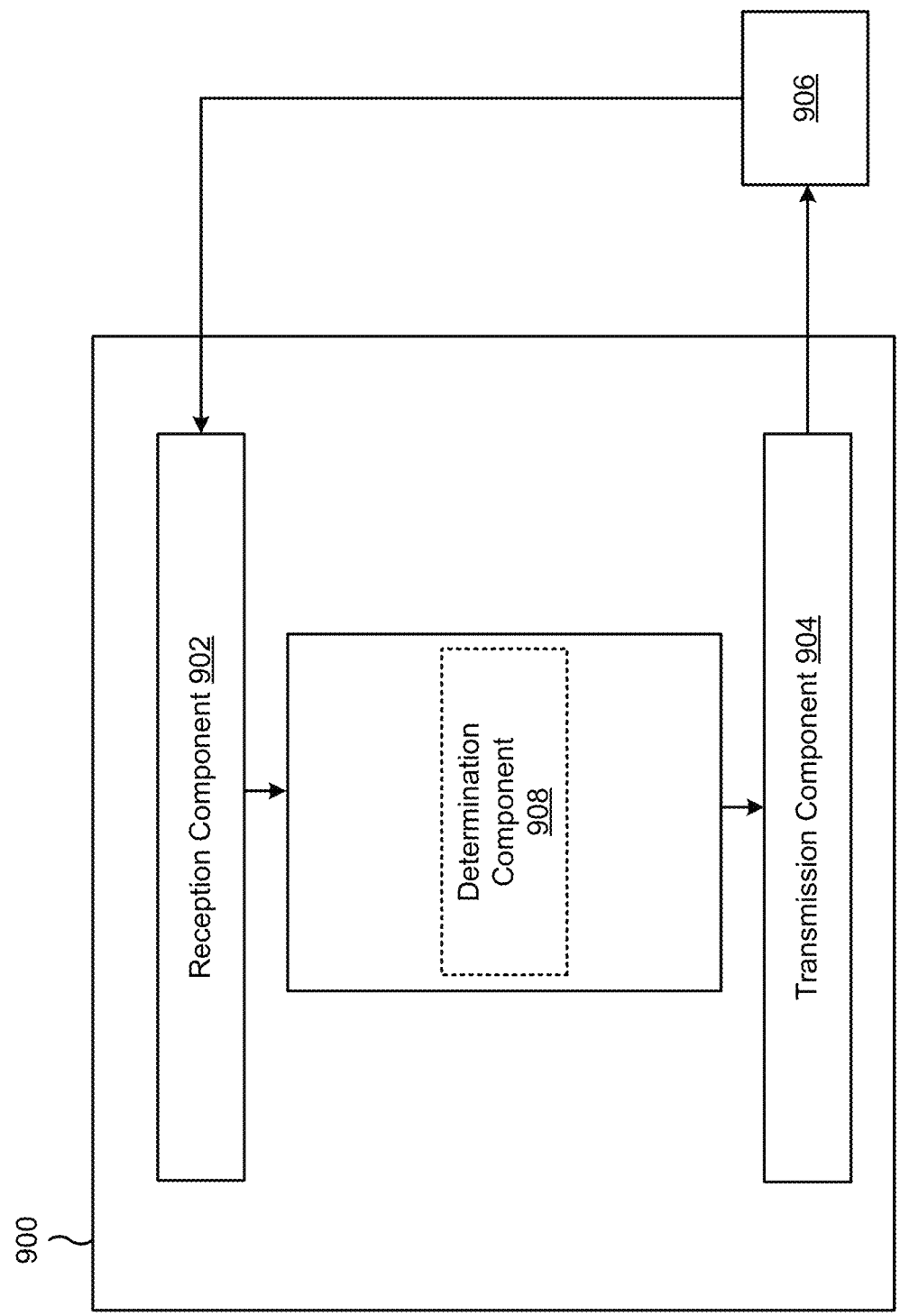
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, a TP hopping configuration that indicates one or more TPs and a TP hopping pattern associated with one or more hops between the one or more TPs. The reception component 902 and/or the transmission component 904 may communicate, with the base station, using a TP of the one or more TPs based at least in part on the TP hopping configuration.

The transmission component 904 may transmit, to the base station, a request for the TP hopping configuration.

The determination component 908 may identify the TP hopping configuration based at least in part on an implicit indication.

The determination component 908 may identify a trigger associated with activating or deactivating the TP hopping pattern.

The determination component 908 may activate the TP hopping pattern after an amount of time after identifying a trigger to activate the TP hopping pattern, where the amount of time is at least one of configured for the UE, indicated by the base station, or based at least in part on a capability of the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
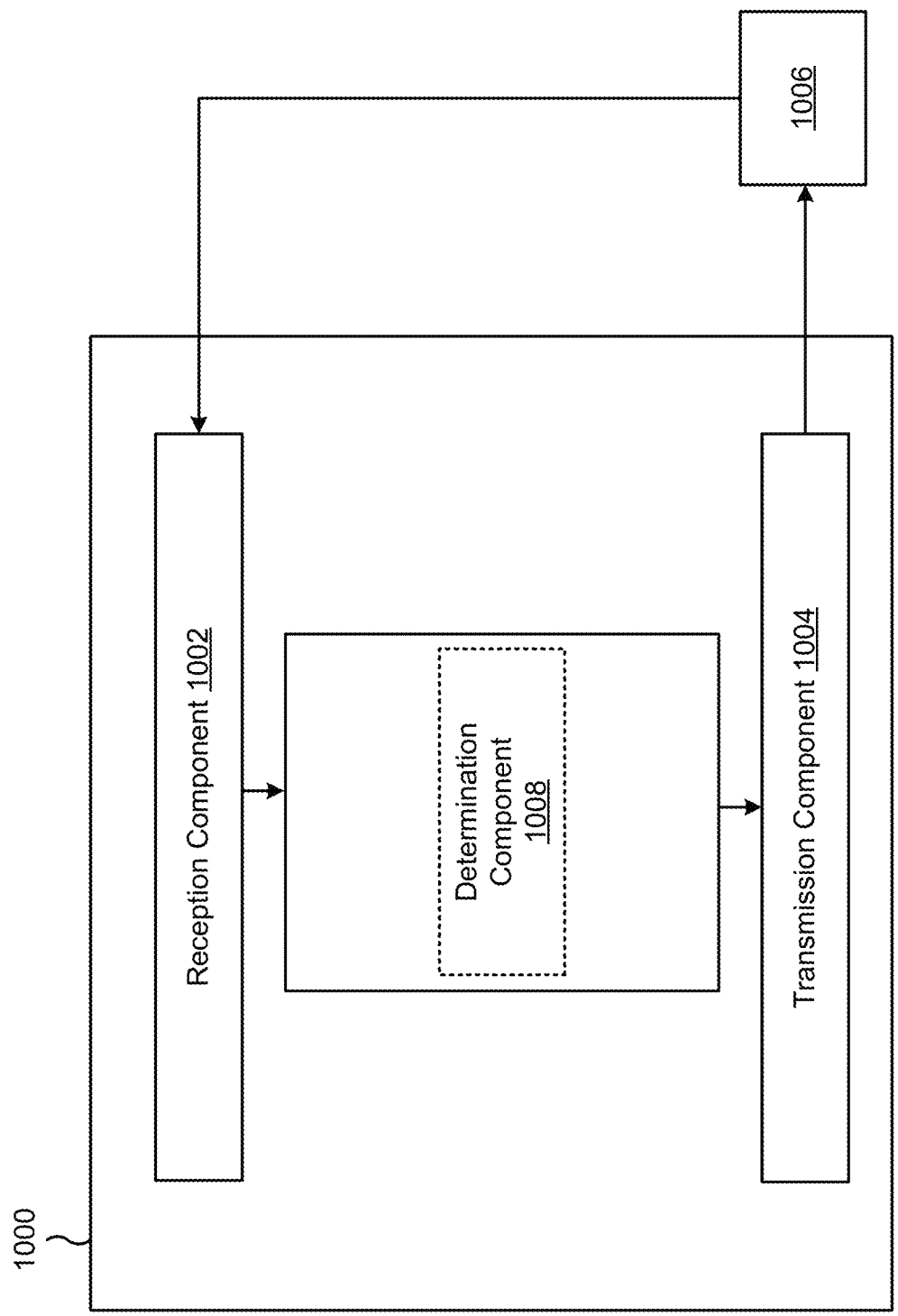

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The determination component 1008 may determine a TP hopping configuration that indicates one or more TPs and a TP hopping pattern associated with one or more hops between the one or more TPs. The transmission component 1004 may transmit, to one or more UEs, the TP hopping configuration. The reception component 1002 and/or the transmission component 1004 may communicate, with a UE of the one or more UEs, using a TP of the one or more TPs based at least in part on the TP hopping configuration.

The reception component 1002 may receive, from the UE, a request for the TP hopping configuration.

The determination component 1008 may identify the TP hopping configuration based at least in part on an implicit indication.

The determination component 1008 may identify a trigger associated with activating or deactivating the TP hopping pattern.

The determination component 1008 may activate the TP hopping pattern after an amount of time after identifying a trigger to activate the TP hopping pattern, wherein the amount of time is at least one of configured for the UE, indicated to the UE, or based at least in part on a capability of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, a transmission part (TP) hopping configuration that indicates one or more TPs and a TP hopping pattern associated with one or more hops between the one or more TPs; and communicating, with the base station, using a TP of the one or more TPs based at least in part on the TP hopping configuration.

Aspect 2: The method of Aspect 1, wherein the TP indicates a time domain resource allocation and a frequency domain resource allocation associated with the TP and one or more transmission parameters associated with the TP.

Aspect 3: The method of Aspect 2, wherein the one or more transmission parameters include at least one of: a waveform type, a cyclic prefix length, a guard interval length, a subcarrier spacing, a code rate, a bandwidth, or one or more switching times.

Aspect 4: The method of Aspect 3, wherein the waveform type includes at least one of: a single carrier waveform, a single carrier frequency domain waveform, a single carrier time domain waveform, a discrete Fourier transform spread orthogonal frequency-division multiplexing (DFT-s-OFDM) waveform, a single carrier quadrature amplitude modulation (SC-QAM) waveform, or an orthogonal frequency-division multiplexing (OFDM) waveform.

Aspect 5: The method of any one of Aspects 1-4, wherein receiving the TP hopping configuration comprises: receiving an indication of the TP hopping pattern for the TP of the one or more TPs, the TP hopping pattern indicating, for the TP and from a first TP period to a second TP period, a change in at least one of: a time domain resource allocation for the TP, a frequency domain resource allocation for the TP, or a beam associated with the TP.

Aspect 6: The method of Aspect 5, wherein the TP hopping pattern is based at least in part on a reference point associated with a TP period associated with the TP.

Aspect 7: The method of Aspect 6, wherein the reference point is at least one of: a starting time of the TP period, an ending time of the TP period, a lowest frequency domain resource allocated for the TP, or a highest frequency domain resource allocated for the TP.

Aspect 8: The method of any one of Aspects 1-7, wherein receiving the TP hopping configuration comprises: receiving an indication of multiple TPs and the TP hopping pattern associated with the multiple TPs, wherein the TP hopping pattern indicates a first TP, of the multiple TPs, to be used by the UE for a first TP period and a second TP, of the multiple TPs, to be used by the UE for a second TP period.

Aspect 9: The method of Aspect 8, wherein receiving the TP hopping configuration comprises: receiving an indication of a first index associated with the first TP and a second index associated with the second TP.

Aspect 10: The method of any one of Aspects 1-9, wherein receiving the TP hopping configuration comprises receiving at least one of: a TP hopping configuration for uplink communications, a TP hopping configuration for downlink communications, a TP hopping configuration for uplink communications and downlink communications, a TP hopping configuration that is specific for the UE, a TP hopping configuration that is associated with a group of UEs that includes the UE, a TP hopping configuration for the TP, or a TP hopping configuration for a group of TPs that includes the one or more TPs.

Aspect 11: The method of any one of Aspects 1-10, wherein receiving the TP hopping configuration comprises: receiving the TP hopping configuration indicating one or more switching gaps or one or more guard bands between a hop from a first TP to a second TP.

Aspect 12: The method of any one of Aspects 1-11, wherein receiving the TP hopping configuration comprises:

receiving, from the base station, the TP hopping configuration via at least one of: a radio resource control message, a medium access control (MAC) control element (MAC-CE) message, or a downlink control information (DCI) message.

Aspect 13: The method of any one of Aspects 1-12, further comprising: transmitting, to the base station, a request for the TP hopping configuration, and wherein receiving the TP hopping configuration is based at least in part on transmitting the request for the TP hopping configuration.

Aspect 14: The method of any one of Aspects 1-13, further comprising: identifying the TP hopping configuration based at least in part on an implicit indication.

Aspect 15: The method of Aspect 14, wherein the implicit indication includes at least one of: one or more rules, a semi-persistent scheduling (SPS) pattern associated with communications between the UE and the base station, a configured grant pattern associated with communications between the UE and the base station, or a waveform usage associated with communications between the UE and the base station.

Aspect 16: The method of any one of Aspects 1-15, further comprising: identifying a trigger associated with activating or deactivating the TP hopping pattern.

Aspect 17: The method of Aspect 16, wherein identifying the trigger associated with activating or deactivating the TP hopping pattern comprises: receiving, from the base station, a message that activates or deactivates the TP hopping pattern, wherein the message includes at least one of: a radio resource control message, a medium access control (MAC) control element (MAC-CE) message, a downlink control information (DCI) message, a DCI message that is specific to the UE, or a group-common DCI message.

Aspect 18: The method of Aspect 16, wherein identifying the trigger associated with activating or deactivating the TP hopping pattern comprises: identifying the trigger based at least in part on one or more rules.

Aspect 19: The method of any one of Aspects 1-18, wherein a TP reference point for the TP is defined with respect to a resource allocation associated with the TP, and wherein the TP reference point for the TP remains the same with respect to the resource allocation throughout the TP hopping pattern.

Aspect 20: The method of any one of Aspects 1-19, further comprising: activating the TP hopping pattern after an amount of time after identifying a trigger to activate the TP hopping pattern, wherein the amount of time is at least one of: configured for the UE, indicated by the base station, or based at least in part on a capability of the UE.

Aspect 21: The method of Aspect 20, wherein activating the TP hopping pattern the amount of time after identifying a trigger to activate the TP hopping pattern comprises: initiating a timer associated with the amount of time after: receiving, from the base station, a message activating the TP hopping pattern, or transmitting, to the base station, an uplink message carrying an acknowledgement (ACK) message associated with a downlink message activating the TP hopping pattern.

Aspect 22: The method of any one of Aspects 1-21, wherein one or more parameters for a procedure are transparent to the TP hopping configuration or are defined separately for each TP associated with the TP hopping configuration.

Aspect 23: The method of Aspect 22, wherein the procedure includes at least one of: a hybrid automatic repeat request procedure, a radio link management procedure, a radio resource management measurement procedure, a beam failure detection procedure, or a beam failure recovery procedure.

Aspect 24: The method of any one of Aspects 1-23, wherein receiving the TP hopping configuration comprises: receiving an indication of a default TP associated with the TP hopping pattern.

Aspect 25: A method of wireless communication performed by a base station, comprising: determining a transmission part (TP) hopping configuration that indicates one or more TPs and a TP hopping pattern associated with one or more hops between the one or more TPs; transmitting, to one or more user equipments (UEs), the TP hopping configuration; and communicating, with a UE of the one or more UEs, using a TP of the one or more TPs based at least in part on the TP hopping configuration.

Aspect 26: The method of Aspect 25, wherein the TP indicates a time domain resource allocation and a frequency domain resource allocation associated with the TP and one or more transmission parameters to be used by the UE associated with the TP.

Aspect 27: The method of Aspect 26, wherein the one or more transmission parameters include at least one of: a waveform type, a cyclic prefix length, a guard interval length, a subcarrier spacing, a code rate, a bandwidth, or one or more switching times.

Aspect 28: The method of Aspect 27, wherein the waveform type includes at least one of: a single carrier waveform, a single carrier frequency domain waveform, a single carrier time domain waveform, a discrete Fourier transform spread orthogonal frequency-division multiplexing (DFT-s-OFDM) waveform, a single carrier quadrature amplitude modulation (SC-QAM) waveform, or an orthogonal frequency-division multiplexing (OFDM) waveform.

Aspect 29: The method of any one of Aspects 25-28, wherein transmitting the TP hopping configuration comprises: transmitting an indication of the TP hopping pattern for the TP of the one or more TPs, the TP hopping pattern indicating, for the TP and from a first TP period to a second TP period, a change in at least one of: a time domain resource allocation for the TP, a frequency domain resource allocation for the TP, or a beam associated with the TP.

Aspect 30: The method of Aspect 29, wherein the TP hopping pattern is based at least in part on a reference point associated with a TP period associated with the TP.

Aspect 31: The method of Aspect 30, wherein the reference point is at least one of: a starting time of the TP period, an ending time of the TP period, a lowest frequency domain resource allocated for the TP, or a highest frequency domain resource allocated for the TP.

Aspect 32: The method of any one of Aspects 25-31, wherein transmitting the TP hopping configuration comprises: transmitting an indication of multiple TPs and the TP hopping pattern associated with the multiple TPs, wherein the TP hopping pattern indicates a first TP, of the multiple TPs, to be used by the UE for a first TP period and a second TP, of the multiple TPs, to be used by the UE for a second TP period.

Aspect 33: The method of Aspect 32, wherein transmitting the TP hopping configuration comprises: transmitting an indication of a first index associated with the first TP and a second index associated with the second TP.

Aspect 34: The method of any one of Aspects 25-33, wherein transmitting the TP hopping configuration comprises transmitting at least one of: a TP hopping configuration for uplink communications, a TP hopping configuration for downlink communications, a TP hopping configuration for uplink communications and downlink communications, a TP hopping configuration that is specific for the UE, a TP hopping configuration that is associated with a group of UEs that includes the one or more UEs, a TP hopping configuration for the TP, or a TP hopping configuration for a group of TPs that includes the one or more TPs.

Aspect 35: The method of any one of Aspects 25-34, wherein transmitting the TP hopping configuration comprises: transmitting the TP hopping configuration indicating one or more switching gaps or one or more guard bands between a hop from a first TP to a second TP.

Aspect 36: The method of any one of Aspects 25-35, wherein transmitting the TP hopping configuration comprises: transmitting the TP hopping configuration via at least one of a radio resource control message, a medium access control (MAC) control element (MAC-CE) message, or a downlink control information (DCI) message.

Aspect 37: The method of any one of Aspects 25-36, further comprising: receiving, from the UE, a request for the TP hopping configuration, and wherein transmitting the TP hopping configuration is based at least in part on receiving the request for the TP hopping configuration.

Aspect 38: The method of any one of Aspects 25-37, further comprising: identifying the TP hopping configuration based at least in part on an implicit indication.

Aspect 39: The method of Aspect 38, wherein the implicit indication includes at least one of: one or more rules, a semi-persistent scheduling (SPS) pattern associated with communications between the UE and the base station, a configured grant pattern associated with communications between the UE and the base station, or a waveform usage associated with communications between the UE and the base station.

Aspect 40: The method of any one of Aspects 25-39, further comprising: identifying a trigger associated with activating or deactivating the TP hopping pattern.

Aspect 41: The method of Aspect 40, wherein identifying the trigger associated with activating or deactivating the TP hopping pattern comprises: transmitting, to the UE, a message that activates or deactivates the TP hopping pattern, wherein the message includes at least one of: a radio resource control message, a medium access control (MAC) control element (MAC-CE) message, a downlink control information (DCI) message, a DCI message that is specific to the UE, or a group-common DCI message.

Aspect 42: The method of Aspect 40, wherein identifying the trigger associated with activating or deactivating the TP hopping pattern comprises: identifying the trigger based at least in part on one or more rules.

Aspect 43: The method of any one of Aspects 25-42, wherein a TP reference point for the TP is defined with respect to a resource allocation associated with the TP, and wherein the TP reference point for the TP remains the same with respect to the resource allocation throughout the TP hopping pattern.

Aspect 44: The method of any one of Aspects 25-43, further comprising: activating the TP hopping pattern after an amount of time after identifying a trigger to activate the TP hopping pattern, wherein the amount of time is at least one of: configured for the UE, indicated to the UE, or based at least in part on a capability of the UE.

Aspect 45: The method of Aspect 44, wherein activating the TP hopping pattern the amount of time after identifying a trigger to activate the TP hopping pattern comprises: initiating a timer associated with the amount of time after: transmitting, to the UE, a message activating the TP hopping pattern, or receiving, from the UE, an uplink message carrying an acknowledgement (ACK) message associated with a downlink message activating the TP hopping pattern.

Aspect 46: The method of any one of Aspects 25-45, wherein one or more parameters for a procedure are transparent to the TP hopping configuration or are defined separately for each TP associated with the TP hopping configuration.

Aspect 47: The method of Aspect 46, wherein the procedure includes at least one of: a hybrid automatic repeat request procedure, a radio link management procedure, a radio resource management measurement procedure, a beam failure detection procedure, or a beam failure recovery procedure.

Aspect 48: The method of any one of Aspects 25-47, wherein transmitting the TP hopping configuration comprises: transmitting an indication of a default TP associated with the TP hopping pattern.

Aspect 49: An apparatus for wireless communication at a device, comprising a processor; memory coupled with the processor; and instructions stored in the memory and executable by the processor to cause the apparatus to perform the method of one or more Aspects of Aspects 1-24.

Aspect 50: A device for wireless communication, comprising a memory and one or more processors coupled to the memory, the memory and the one or more processors configured to perform the method of one or more Aspects of Aspects 1-24.

Aspect 51: An apparatus for wireless communication, comprising at least one means for performing the method of one or more Aspects of Aspects 1-24.

Aspect 52: A non-transitory computer-readable medium storing code for wireless communication, the code comprising instructions executable by a processor to perform the method of one or more Aspects of Aspects 1-24.

Aspect 53: A non-transitory computer-readable medium storing a set of instructions for wireless communication, the set of instructions comprising one or more instructions that, when executed by one or more processors of a device, cause the device to perform the method of one or more Aspects of Aspects 1-24.

Aspect 54: An apparatus for wireless communication at a device, comprising a processor; memory coupled with the processor; and instructions stored in the memory and executable by the processor to cause the apparatus to perform the method of one or more Aspects of Aspects 25-48.

Aspect 55: A device for wireless communication, comprising a memory and one or more processors coupled to the memory, the memory and the one or more processors configured to perform the method of one or more Aspects of Aspects 25-48.

Aspect 56: An apparatus for wireless communication, comprising at least one means for performing the method of one or more Aspects of Aspects 25-48.

Aspect 57: A non-transitory computer-readable medium storing code for wireless communication, the code comprising instructions executable by a processor to perform the method of one or more Aspects of Aspects 25-48.

Aspect 58: A non-transitory computer-readable medium storing a set of instructions for wireless communication, the set of instructions comprising one or more instructions that, when executed by one or more processors of a device, cause the device to perform the method of one or more Aspects of Aspects 25-48.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   receive, from a network entity, a transmission part (TP) hopping configuration that indicates a plurality of transmission parts (TPs) and a TP hopping pattern associated with one or more hops between waveforms associated with the plurality of TPs,
   wherein the waveforms include:
      at least one single carrier quadrature amplitude modulation (SC-QAM) waveform corresponding to a first resource allocation for a first TP of the plurality of TPs, and
      at least one frequency domain waveform corresponding to a second resource allocation for a second TP of the plurality of TPs, and
   wherein the TP hopping configuration further indicates;
      at least one switching gap and at least one guard band between the one or more hops; and
      whether the TP hopping pattern is for use with one or more of: a downlink communication or an uplink communication, wherein a first waveform, of the waveforms, for use with the uplink communication and a second waveform, of the waveforms, for use with the downlink communication are different; and
   communicate, with the network entity, the first TP or the second TP based at least in part on the TP hopping configuration.

2. The UE of claim 1, wherein the one or more processors are configured, when receiving the TP hopping configuration, to:
   receive an indication of the TP hopping pattern for the first TP or the second TP, the TP hopping pattern indicating, from a first TP period to a second TP period, a change in at least one of:
   the first resource allocation for the first TP,
   the second resource allocation, or
   a beam associated with the first TP or the second TP.

3. The UE of claim 1, wherein the one or more processors are configured, when receiving the TP hopping configuration, to:
   receive an indication of the plurality of TPs and the TP hopping pattern associated with the plurality of TPs, wherein the TP hopping pattern indicates the first TP, to be used by the UE for a first TP period or the second TP; to be used by the UE for a second TP period.

4. The UE of claim 1, wherein the one or more processors are configured, when receiving the TP hopping configuration, to receive at least one of:
   a TP hopping configuration that is specific for the UE,
   a TP hopping configuration that is associated with a group of UEs that includes the UE,
   a TP hopping configuration for the first TP or the second TP, or
   a TP hopping configuration for a group of TPs plurality of TPs.

5. The UE of claim 1, wherein the one or more processors are further configured to:
   transmit, to the network entity, a request for the TP hopping configuration, and
   wherein receiving the TP hopping configuration is based at least in part on transmitting the request for the TP hopping configuration.

6. The UE of claim 1, wherein the one or more processors are further configured to:
identify the TP hopping configuration based at least in part on an implicit indication.

7. The UE of claim 1, wherein the one or more processors are further configured to:
identify a trigger associated with activating or deactivating the TP hopping pattern based at least in part on:
transmitting a request to activate or deactivate the TP hopping pattern,
receiving a message that activates or deactivates the TP hopping pattern, or
identifying the trigger based at least in part on one or more rules.

8. The UE of claim 1, wherein a TP reference point for the first TP or the second TP is defined with respect to the first resource allocation or the second resource allocation, and wherein the TP reference point remains the same throughout the TP hopping pattern.

9. The UE of claim 1, wherein the one or more processors are further configured to:
activate the TP hopping pattern after an amount of time after identifying a trigger to activate the TP hopping pattern, wherein the amount of time is at least one of:
configured for the UE,
indicated by the network entity, or
based at least in part on a capability of the UE.

10. The UE of claim 1, wherein one or more parameters for a procedure are transparent to the TP hopping configuration or are defined separately for each TP associated with the TP hopping configuration.

11. The UE of claim 1, wherein the one or more processors are configured, when receiving the TP hopping configuration, to:
receive an indication of a default TP associated with the TP hopping pattern.

12. A network entity for wireless communication, comprising:
one or more memories; and
one or more processors, coupled to the one or more memories, configured to:
determine a transmission part (TP) hopping configuration that indicates a plurality of transmission parts (TPs) and a TP hopping pattern associated with one or more hops between waveforms associated with the plurality of TPs,
wherein the waveforms include:
at least one single carrier quadrature amplitude modulation (SC-QAM) waveform corresponding to a first resource allocation for a first TP of the plurality of TPs, and
at least one frequency domain waveform corresponding to a second resource allocation for a second TP of the plurality of TPs, and
wherein the TP hopping configuration further indicates;
at least one switching gap and at least one guard band between the one or more hops; and
whether the TP hopping pattern is for use with one or more of: a downlink communication or an uplink communication, wherein a first waveform, of the waveforms, for use with the uplink communication and a second waveform, of the waveforms, for use with the downlink communication are different; and
transmit, to one or more user equipments (UEs), the TP hopping configuration; and
communicate, with a UE of the one or more UEs, using a TP of the TPs based at least in part on the TP hopping configuration.

13. The network entity of claim 12, wherein the one or more processors are configured, when transmitting the TP hopping configuration, to:
transmit an indication of the TP hopping pattern for the first TP or the second TP, the TP hopping pattern indicating, from a first TP period to a second TP period, a change in at least one of:
the first resource allocation, p2 the second resource allocation, or
a beam associated with the first TP or the second TP.

14. The network entity of claim 12, wherein the one or more processors are configured, when transmitting the TP hopping configuration, to:
transmit an indication of the plurality of TPs and the TP hopping pattern associated with the plurality of TPs, wherein the TP hopping pattern indicates of the multiple TPs, to be used by the UE for a first TP period or the second TP; to be used by the UE for a second TP period.

15. The network entity of claim 12, wherein the one or more processors are configured, when transmitting the TP hopping configuration, to transmit at least one of:
a TP hopping configuration that is specific for the UE,
a TP hopping configuration that is associated with a group of UEs that includes the one or more UEs,
a TP hopping configuration for the first TP or the second TP, or
a TP hopping configuration for a group of TPs that includes the one or more plurality of TPs.

16. The network entity of claim 12, wherein the one or more 16. processors are further configured to:
receive, from the UE, a request for the TP hopping configuration, and
wherein transmitting the TP hopping configuration is based at least in part on receiving the request for the TP hopping configuration.

17. The network entity of claim 12, wherein the one or more processors are further configured to:
identify a trigger associated with activating or deactivating the TP hopping pattern based at least in part on:
receiving a request to activate or deactivate the TP hopping pattern,
transmitting a message that activates or deactivates the TP hopping pattern, or
identifying the trigger based at least in part on one or more rules.

18. The network entity of claim 12, wherein the one or more processors are further configured to:
activate the TP hopping pattern after an amount of time after identifying a trigger to activate the TP hopping pattern, wherein the amount of time is at least one of:
configured for the UE,
indicated to the UE, or
based at least in part on a capability of the UE.

19. The network entity of claim 12, wherein one or more parameters for a procedure are transparent to the TP hopping configuration or are defined separately for each TP associated with the TP hopping configuration.

20. The network entity of claim 12, wherein the one or more processors are configured, when transmitting the TP hopping configuration, to:
transmit an indication of a default TP associated with the TP hopping pattern.

21. A method of wireless communication performed by a user equipment (UE), comprising:
receiving, from a network entity, a transmission part (TP) hopping configuration that indicates a plurality of transmission parts (TPs) and a TP hopping pattern associated with one or more hops between waveforms associated with the plurality of TPs,
wherein the waveforms include:
at least one single carrier quadrature amplitude modulation (SC-QAM) waveform corresponding to a first resource allocation for a first TP of the plurality of TPs, and
at least one frequency domain waveform corresponding to a second resource allocation for a second TP of the plurality of TPs, and
wherein the TP hopping configuration further indicates;
at least one switching gap and at least one guard band between the one or more hops; and
whether the TP hopping pattern is for use with one or more of: a downlink communication or an uplink communication, wherein a first waveform, of the waveforms, for use with the uplink communication and a second waveform, of the waveforms, for use with the downlink communication are different; and
communicating, with the network entity, using the first TP or the second TP based at least in part on the TP hopping configuration.

22. The method of claim 21, wherein receiving the TP hopping configuration comprises:
receiving an indication of the TP hopping pattern for the first TP or the second TP, the TP hopping pattern indicating, from a first TP period to a second TP period, a change in at least one of:
the first resource allocation,
the second resource allocation, or
a beam associated with the first TP or the second TP.

23. The method of claim 21, wherein receiving the TP hopping configuration comprises:
receiving an indication of plurality of TPs and the TP hopping pattern associated with the plurality of TPs, wherein the TP hopping pattern indicates the first TP, to be used by the UE for a first TP period or the second TP; to be used by the UE for a second TP period.

24. The method of claim 21, wherein receiving the TP hopping configuration comprises receiving at least one of:
a TP hopping configuration that is specific for the UE,
a TP hopping configuration that is associated with a group of UEs that includes the UE,
a TP hopping configuration for the first TP or the second TP, or
a TP hopping configuration for a group of TPs that includes the one or more plurality of TPs.

25. The method of claim 21, further comprising:
identifying a trigger associated with activating or deactivating the TP hopping pattern based at least in part on:
transmitting a request to activate or deactivate the TP hopping pattern,
receiving a message that activates or deactivates the TP hopping pattern, or
identifying the trigger based at least in part on one or more rules.

26. A method of wireless communication performed by a network entity, comprising:
determining a transmission part (TP) hopping configuration that indicates a plurality of transmission parts (TPs) and a TP hopping pattern associated with one or more hops between waveforms associated with the plurality of TPs,
wherein the waveforms include:
at least one single carrier quadrature amplitude modulation (SC-QAM) waveform corresponding to a first resource allocation for a first TP of the plurality of TPs, and
at least frequency domain waveform corresponding to a second resource allocation for a second TP of the plurality of TPs, and wherein the TP hopping configuration further indicates;
at least one switching gap and at least one guard band between the one or more hops; and
whether the TP hopping pattern is for use with one or more of: a downlink communication or an uplink communication, wherein a first waveform, of the waveforms, for use with the uplink communication and a second waveform, of the waveforms, for use with the downlink communication are different;
transmitting, to one or more user equipments (UEs), the TP hopping configuration; and
communicating, with a UE of the one or more UEs, using the first TP or the second TP based at least in part on the TP hopping configuration.

27. The method of claim 26, wherein transmitting the TP hopping configuration comprises:
transmitting an indication of the TP hopping pattern for the first TP or the second TP, the TP hopping pattern indicating, from a first TP period to a second TP period, a change in at least one of:
the first resource allocation,
the second resource allocation, or
a beam associated with the first TP or the second TP.

28. The method of claim 26, wherein transmitting the TP hopping configuration comprises:
transmitting an indication of the plurality of TPs and the TP hopping pattern associated with the plurality of TPs, wherein the TP hopping pattern indicates the first TP, to be used by the UE for a first TP period or the second TP; to be used by the UE for a second TP period.

29. The method of claim 26, wherein transmitting the TP hopping configuration comprises transmitting at least one of:
a TP hopping configuration that is specific for the UE,
a TP hopping configuration that is associated with a group of UEs that includes the one or more UEs,
a TP hopping configuration for the first TP or the second TP, or
a TP hopping configuration for a group of TPs that includes the plurality of TPs.

30. The method of claim 26, further comprising:
identifying a trigger associated with activating or deactivating the TP hopping pattern based at least in part on at least one of:
receiving a request to activate or deactivate the TP hopping pattern,
transmitting a message that activates or deactivates the TP hopping pattern, or
identifying the trigger based at least in part on one or more rules.

* * * * *